(12) United States Patent
Matsuoka et al.

(10) Patent No.: US 12,577,390 B2
(45) Date of Patent: Mar. 17, 2026

(54) RESIN COMPOSITION, METHOD FOR PRODUCING MODIFIED HYDROGENATED BLOCK COPOLYMER, AND MOLDED ARTICLE

(71) Applicant: Asahi Kasei Kabushiki Kaisha, Tokyo (JP)

(72) Inventors: Yuta Matsuoka, Tokyo (JP); Takashi Sukegawa, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 768 days.

(21) Appl. No.: 17/927,144

(22) PCT Filed: May 14, 2021

(86) PCT No.: PCT/JP2021/018486
§ 371 (c)(1),
(2) Date: Nov. 22, 2022

(87) PCT Pub. No.: WO2021/241291
PCT Pub. Date: Dec. 2, 2021

(65) Prior Publication Data
US 2023/0193017 A1 Jun. 22, 2023

(30) Foreign Application Priority Data

May 27, 2020 (JP) ................................ 2020-091932

(51) Int. Cl.

| | |
|---|---|
| C08L 53/02 | (2006.01) |
| C08F 8/00 | (2006.01) |
| C08F 8/04 | (2006.01) |
| C08F 8/30 | (2006.01) |
| C08F 8/32 | (2006.01) |
| C08F 8/46 | (2006.01) |
| C08F 222/06 | (2006.01) |
| C08F 287/00 | (2006.01) |
| C08F 297/04 | (2006.01) |
| C08L 23/08 | (2025.01) |
| C08L 29/04 | (2006.01) |
| C08L 77/00 | (2006.01) |
| C08L 77/02 | (2006.01) |
| C08L 77/06 | (2006.01) |
| C08L 101/00 | (2006.01) |
| C08J 5/18 | (2006.01) |

(52) U.S. Cl.
CPC .............. *C08L 53/025* (2013.01); *C08F 8/00* (2013.01); *C08F 8/04* (2013.01); *C08F 8/30* (2013.01); *C08F 8/32* (2013.01); *C08F 8/46* (2013.01); *C08F 222/06* (2013.01); *C08F 287/00* (2013.01); *C08F 297/04* (2013.01); *C08L 23/08* (2013.01); *C08L 29/04* (2013.01); *C08L 77/00* (2013.01); *C08L 77/02* (2013.01); *C08L 77/06* (2013.01); *C08L 101/00* (2013.01); *C08F 2810/40* (2013.01); *C08J*

*5/18* (2013.01); *C08J 2323/08* (2013.01); *C08J 2329/04* (2013.01); *C08J 2377/00* (2013.01); *C08L 53/02* (2013.01); *C08L 2203/30* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 5,209,985 A | 5/1993 | Ueda et al. | |
| 2004/0157994 A1* | 8/2004 | Kubo ........................ | C09J 7/38 |
| | | | 525/88 |
| 2009/0312449 A1 | 12/2009 | Sasaki et al. | |
| 2019/0185665 A1 | 6/2019 | Inagaki et al. | |

FOREIGN PATENT DOCUMENTS

| | | |
|---|---|---|
| EP | 0398758 A2 | 11/1990 |
| JP | H03-128964 A | 5/1991 |
| JP | H04-068343 A | 3/1992 |
| JP | H04-068343 B2 | 11/1992 |
| JP | H08-165431 A | 6/1996 |

(Continued)

OTHER PUBLICATIONS

International Search Report (with partial translation) and Written Opinion dated Jul. 20, 2021, for corresponding International Patent Application No. PCT/JP2021/018486.

(Continued)

*Primary Examiner* — Eli D. Strah
(74) *Attorney, Agent, or Firm* — Morgan, Lewis & Bockius LLP

(57) ABSTRACT

The present invention provides a resin composition, containing: a component (I) of a modified block copolymer (I) that has a polymer block (A) mainly comprising a vinyl aromatic compound unit, and a polymer block (B) mainly comprising a conjugated diene compound unit, and has 0.01% by mass or more of a polar group; and a component (II) of a resin (II) having a polar group (excluding the component (I)), in which a mass ratio between the component (I) and the component (II), (I)/(II), is 1/99 to 70/30, and the component (I) satisfies the following conditions (i) to (iii):

<Condition (i)> A content of the vinyl aromatic compound unit in the modified block copolymer (I) is 1 to 30% by mass.

<Condition (ii)> A vinyl bond content is 1 to 55%.

<Condition (iii)> A hydrogenation rate is 5 to 55%.

16 Claims, No Drawings

(56)         References Cited

FOREIGN PATENT DOCUMENTS

| | | | |
|---|---|---|---|
| JP | H09-176429 | A | 7/1997 |
| JP | 2003-201312 | A | 7/2003 |
| JP | 2005-187533 | A | 7/2005 |
| JP | 2005-194516 | A | 7/2005 |
| JP | 2005-226055 | A | 8/2005 |
| JP | 2005226056 | A * | 8/2005 |
| JP | 2005-290123 | A | 10/2005 |
| JP | 2006-249311 | A | 9/2006 |
| JP | 2016-089171 | A | 5/2016 |
| JP | 2018-184589 | A | 11/2018 |
| JP | 2019-218561 | A | 12/2019 |
| JP | 2020-033575 | A | 3/2020 |
| WO | 2012/173230 | A1 | 12/2012 |
| WO | 2019/230527 | A1 | 12/2019 |

OTHER PUBLICATIONS

International Preliminary Report on Patentability and Written Opinion issued in corresponding International Patent Application No. PCT/JP2021/018486 dated Dec. 8, 2022.
European Search Report issued in European Patent Application No. 21813962.4 dated Oct. 10, 2023.

* cited by examiner

RESIN COMPOSITION, METHOD FOR PRODUCING MODIFIED HYDROGENATED BLOCK COPOLYMER, AND MOLDED ARTICLE

TECHNICAL FIELD

The present invention relates to a resin composition, a method for producing a modified hydrogenated block copolymer, and a molded article.

BACKGROUND ART

A resin composition containing, as a component, a resin having high strength such as engineering plastics is excellent in rigidity but inferior in low temperature physical properties (shock resistance and toughness). Therefore, various modifiers have been conventionally examined.

For example, Patent Literature 1 discloses, for improving shock resistance of a polyamide resin under low temperature conditions, a polyamide resin composition using a modified block copolymer that has, as an elastomer of a modifier, a vinyl aromatic compound polymer block A, and an olefin compound polymer block B bonded to a molecule unit containing a carboxylic acid group or a derivative group thereof, wherein the block B has a degree of unsaturation of 20% or less, and the amount of the block A is 10 to 23% by mass with respect to the total amount of the block A and the block B.

Patent Literature 2 discloses, for improving shock resistance of a polyamide resin under low temperature conditions, a resin composition using a modified block copolymer that comprises, as an elastomer of a modifier, a vinyl aromatic compound polymer block and a conjugated diene compound polymer block bonded to maleic anhydride, wherein 25% of a conjugated diene compound polymer is hydrogenated, and the amount of the vinyl aromatic compound polymer block is 40% by mass with respect to the total amount of the polymer blocks.

In recent years, in accordance with application of resin products to a variety of uses and spread of a region of use, a technique for imparting shock resistance and toughness to engineering plastics and the like tends to be demanded under further lower temperature conditions.

For example, a freezer for storing large fish and large meat is usually cooled to about −60° C., and therefore, a container used for storage in the freezer, an interior finishing material of the freezer, a housing of a cooling device, and a material of a member such as a refrigerant tank are required to have practically sufficient breaking strength, shock resistance and the like under the above-described low temperature conditions.

When members exposed to the ultralow temperature, such as the container and the interior finishing material are made of a metal, the requirement in strength properties can be easily met, but since some apparatuses need to be moved, there is a demand for weight reduction by using a resin as the materials.

In order to withstand use under ultralow temperature conditions, high shock resistance is required so as not to harmfully affect contents at the time of impact, for example, during transportation under the temperature conditions. Besides, when there is a need for rapid cooling to cope with abrupt temperature increase in opening a door of the freezer, a refrigerant is contracted and swollen in the cooling device, and hence, a container or a pipe for holding the refrigerant is required to have high toughness.

In development of a vaccine and storage/transportation of a vaccine attracting attention these days, a process for holding/storing a vaccine material or a vaccine under low temperature conditions of about −50° C. or less to −70° C. or less is necessary, and therefore, there are increasing needs for a molded article excellent in properties under low temperature conditions.

Furthermore, a cylindrical container for holding a liquid such as a vaccine is asymmetric in expansion and contraction caused by temperature change, and hence is required to have high shock resistance and toughness. In addition, in a transportation process, an ultralow temperature freezer is mounted on a vehicle or the like, and hence there is a requirement for weight reduction, by using a resin, of a component, a container, a housing and the like exposed to the low temperature conditions of −50° C. or less to −70° C. or less.

CITATION LIST

Patent Literature

Patent Literature 1
  Japanese Patent Laid-Open No. 3-128964
Patent Literature 2
  Japanese Patent Laid-Open No. 4-68343

SUMMARY OF INVENTION

Technical Problem

The resin compositions disclosed in Patent Literatures 1 and 2 described above, however, have the following problem: physical properties such as shock resistance and toughness are not practically sufficient under ultralow temperature conditions of −50° C. or less.

For improving the physical properties under ultralow temperature conditions, it is preferable that a tan δ peak temperature of an elastomer used as a modifier is on a lower temperature side than a temperature of use, and that it has low rigidity under ultralow temperature conditions. According to examination made by the present inventors, the elastomer contained in the resin composition disclosed in Patent Literature 1 has a tan δ peak temperature in a higher temperature side than the use temperature of an ultralow temperature freezer, and therefore, it may be used in an ordinary freezer or the like, but has the following problem: practically sufficient physical properties cannot be obtained under ultralow temperature conditions.

The elastomer contained as the modifier in the resin composition disclosed in Patent Literature 2 has a tan δ peak temperature on a lower temperature side than the use temperature, but has the following problem: physical properties such as toughness are insufficient under ultralow temperature conditions because of high rigidity.

Accordingly, an object of the present invention is to provide a resin composition having excellent shock resistance and toughness even under ultralow temperature conditions.

Solution to Problem

The present inventors have made earnest studies to solve the above-described problems of the conventional techniques, and as a result, have found that a resin composition containing a modified block copolymer having a prescribed structure exhibits excellent shock resistance and toughness under ultralow temperature conditions, and thus, the present invention was accomplished.

Specifically, the present invention provides the following:

[1]
A resin composition, comprising:
a component (I) of a modified block copolymer (I) that has a polymer block (A) mainly comprising a vinyl aromatic compound unit, and a polymer block (B) mainly comprising a conjugated diene compound unit, and has 0.01% by mass or more of a polar group; and
a component (II) of a resin (II) having a polar group (excluding the component (I)),
wherein a mass ratio between the component (I) and the component (II), (I)/(II), is 1/99 to 70/30, and
the component (I) satisfies the following conditions (i) to (iii):
<Condition (i)>
a content of the vinyl aromatic compound unit in the modified block copolymer (I) is 1 to 30% by mass;
<Condition (ii)>
the polymer block (B) comprises a 1,2-bond and/or 3,4-bond derived unit (a), and a 1,4-bond derived unit (b), and a content of the 1,2-bond and/or 3,4-bond derived unit (a) is 1 to 55% assuming that a total content of the polymer block (B) is 100%; and
<Condition (iii)>
the polymer block (B) comprises an alkenyl monomer unit (a1) resulting from hydrogenation of the 1,2-bond and/or 3,4-bond derived unit (a), and an alkenyl monomer unit (b1) resulting from hydrogenation of the 1,4-bond derived unit (b), and a total content of the alkenyl monomer unit (a1) and the alkenyl monomer unit (b1) is 5 to 55% assuming that the total content of the polymer block (B) is 100%.

[2]
The resin composition according to [1], wherein the component (I) further satisfies the following condition (iv):
<Condition (iv)>
an amount of the alkenyl monomer unit (a1) resulting from hydrogenation of the unit (a) is 80% or more assuming that an amount of the 1,2-bond and/or 3,4-bond derived unit (a) in the polymer block (B) is 100%.

[3]
The resin composition according to [1] or [2], wherein the component (I) is a modified block copolymer having 0.01 to 5% by mass of the polar group.

[4]
The resin composition according to any one of [1] to [3], wherein the component (II) is at least one selected from the group consisting of a polyamide-based resin, an acrylic-based resin, a polyacetal resin, a polycarbonate resin, a polyethylene terephthalate resin, a polybutylene terephthalate resin, a polyphenylene sulfide resin, a polysulfone resin, an epoxy resin, and a phenol resin.

[5]
The resin composition according to any one of [1] to [4], comprising at least one stabilizer as a component (III).

[6]
The resin composition according to any one of [1] to [5], wherein the component (I) further satisfies the following condition (v):
<Condition (v)>
a b value obtained by measuring, with a color-difference meter, a sheet with a thickness of 2 mm obtained by compression molding the component (I) is 30 or less.

4

[7]
The resin composition according to any one of [1] to [6], wherein the polar group of the component (I) is comprised in the polymer block (B).

[8]
The resin composition according to any one of [1] to [7], wherein the polar group of the component (I) is at least one selected from the group consisting of an acid anhydride group, a carboxylic acid group, and a hydroxyl group.

[9]
The resin composition according to any one of [1] to [8], wherein the component (I) further satisfies the following condition (vi):
<Condition (vi)>
when 5 g of the component (I) is dissolved in 200 mL of toluene to be suction filtered through filter paper (thickness: 0.2 mm, maximum diameter: 6 μm, filtering efficiency: 65%), a component remaining on the filter paper calculated based on a mass difference between the filter paper after sufficiently drying and the filter paper before filtration is 0.3 g or less.

[10]
The resin composition according to any one of [1] to [9], comprising, as a component (V) and in an amount of 100 parts by mass or less with respect to 100 parts by mass of the component (I) in the resin composition, a block copolymer (V) that has a polymer block (A') mainly comprising a vinyl aromatic compound unit and a polymer block (B') mainly comprising a conjugated diene compound unit, has no polar group bonded thereto, and satisfies the following conditions (vii) to (ix):
<Condition (vii)>
a content of the vinyl aromatic compound unit in the block copolymer (V) is 1 to 30% by mass;
<Condition (viii)>
the polymer block (B') of the block copolymer (V) comprises a 1,2-bond and/or 3,4-bond derived unit (a'), and a 1,4-bond derived unit (b'), and a content of the 1,2-bond and/or 3,4-bond derived unit (a') is 1 to 55% assuming that a total content of the polymer block (B') is 100%; and
<Condition (ix)>
the polymer block (B') comprises an alkenyl monomer unit (a'1) resulting from hydrogenation of the 1,2-bond and/or 3,4-bond derived unit (a'), and an alkenyl monomer unit (b'1) resulting from hydrogenation of the 1,4-bond derived unit (b'), and a total content of the alkenyl monomer unit (a'1) and the alkenyl monomer unit (b'1) is 5 to 55% assuming that the total content of the polymer block (B') is 100%.

[11]
A method for producing a modified hydrogenated block copolymer, comprising:
a step of producing a block copolymer that has a polymer block (A) mainly comprising a vinyl aromatic compound unit, and a polymer block (B) mainly comprising a conjugated diene compound unit, and satisfies the following conditions (i) and (ii);
a step of hydrogenating the block copolymer in such a manner as to satisfy the following conditions (iii) and (iv) to obtain a hydrogenated block copolymer; and
a modification step of performing a modification reaction of the hydrogenated block copolymer under melt kneading in such a manner as to achieve a content of a polar group of 0.01 to 5% by mass:
<Condition (i)>
a content of the vinyl aromatic compound unit in the modified block copolymer (I) is 1 to 30% by mass;

<Condition (ii)>
the polymer block (B) comprises a 1,2-bond and/or 3,4-bond derived unit (a), and a 1,4-bond derived unit (b), and a content of the 1,2-bond and/or 3,4-bond derived unit (a) is 1 to 55% assuming that a total content of the polymer block (B) is 100%;

<Condition (iii)>
the polymer block (B) comprises an alkenyl monomer unit (a1) resulting from hydrogenation of the 1,2-bond and/or 3,4-bond derived unit (a), and an alkenyl monomer unit (b1) resulting from hydrogenation of the 1,4-bond derived unit (b), and a total content of the alkenyl monomer unit (a1) and the alkenyl monomer unit (b1) is 5 to 55% assuming that the total content of the polymer block (B) is 100%; and <Condition (iv)>
an amount of the alkenyl monomer unit (a1) resulting from hydrogenation of the unit (a) is 80% or more assuming that an amount of the 1,2-bond and/or 3,4-bond derived unit (a) in the polymer block (B) is 100%.

[12]

The method for producing a modified hydrogenated block copolymer according to [11], wherein the modification step is performed after adding a stabilizer to the hydrogenated block copolymer.

[13]

The method for producing a modified hydrogenated block copolymer according to [11] or [12], wherein a temperature of the hydrogenated block copolymer is controlled to 150 to 260° C. in the modification step.

[14]

A method for producing the resin composition according to any one of [1] to [10], wherein the component (I) is obtained by the method for producing a modified hydrogenated block copolymer according to [11].

[15]

A molded article of the resin composition according to any one of [1] to [10].

[16]

The molded article according to [15], being a container.

[17]

The molded article according to [15], being a cylindrical container.

[18]

The molded article according to [15], being a housing.

[19]

The molded article according to [15], being a sheet.

[20]

The molded article according to [15], being a pipe.

[21]

A molded article of a resin composition, comprising:
at least one resin selected from the group consisting of a polyamide-based resin, an acrylic-based resin, a polyacetal resin, a polycarbonate resin, a polyethylene terephthalate resin, a polybutylene terephthalate resin, a polyphenylene sulfide resin, a polysulfone resin, an epoxy resin, and a phenol resin; and
a modified block copolymer having a polymer block (A) mainly comprising a vinyl aromatic compound unit, and a polymer block (B) mainly comprising a conjugated diene compound unit,
wherein the modified block copolymer is a modified block copolymer that has a content of the vinyl aromatic compound unit of 1 to 30% by mass, has a vinyl bond content in the polymer block (B) mainly comprising a conjugated diene compound unit of 1 to 55%, and has at least one selected from the group consisting of an acid anhydride group, a carboxylic acid group, and a hydroxyl group, and
the molded article satisfies the following conditions (I-1) and (II-1):

<Condition (I-1)>
a strip specimen having a width of 10 mm, a length of 170 mm, and a thickness of 2 mm obtained from the molded article has a tensile elongation at break at −50° C. and at a tensile speed of 5 mm/min, of 15% or more; and <Condition (II-1)>
a strip specimen having a width of 10 mm, a length of 40 mm, and a thickness of 2 mm obtained from the molded article has a peak at −60° C. or less in viscoelasticity measurement at a strain of 0.1% and a frequency of 1 Hz.

[22]

The molded article according to [21], wherein the conjugated diene compound unit in the modified block copolymer has a hydrogenation rate of 5 to 55%.

[23]

The molded article according to [21], wherein a Charpy impact value, measured by performing Charpy impact test on a notch-shaped strip specimen that is obtained from the molded article according to [21], and has a width of 10 mm, a length of 80 mm, and a thickness of 2 mm, in accordance with JIS K 7111-1 under a condition of −50° C. with an impact direction edgewise, is 10 kJ/m$^2$ or more.

[24]

The molded article according to [21], being a container.

[25]

The molded article according to [21], being a cylindrical container.

[26]

The molded article according to [21], being a housing.

Advantageous Effects of Invention

According to the present invention, a resin composition excellent in shock resistance and toughness under ultralow temperature conditions can be obtained.

DESCRIPTION OF EMBODIMENT

Now, an embodiment for practicing the present invention (hereinafter referred to as the "present embodiment") will be described in detail.

It is noted that the following present embodiment is merely an example for describing the present invention, and does not intend to limit the present invention to the following contents, but the present invention can be various modified within the scope thereof.

[Resin Composition]

A resin composition of the present embodiment is a resin composition containing:
a component (I) of a modified block copolymer (I) that has a polymer block (A) mainly comprising a vinyl aromatic compound unit, and a polymer block (B) mainly comprising a conjugated diene compound unit, and has 0.01% by mass or more of a polar group; and
a component (II) of a resin (II) having a polar group (excluding the component (I)),
in which a mass ratio between the component (I) and the component (II), (I)/(II), is 1/99 to 70/30, and
the component (I) satisfies the following conditions (i) to (iii):

<Condition (i)>

A content of the vinyl aromatic compound unit in the modified block copolymer (I) is 1 to 30% by mass.

<Condition (ii)>

The polymer block (B) contains a 1,2-bond and/or 3,4-bond derived unit (a), and a 1,4-bond derived unit (b), and a content of the 1,2-bond and/or 3,4-bond derived unit (a) is 1 to 55% assuming that a total content of the polymer block (B) is 100%.

<Condition (iii)>

The polymer block (B) contains an alkenyl monomer unit (a1) resulting from hydrogenation of the 1,2-bond and/or 3,4-bond derived unit (a), and an alkenyl monomer unit (b1) resulting from hydrogenation of the 1,4-bond derived unit (b), and a total content of the alkenyl monomer unit (a1) and the alkenyl monomer unit (b1) is 5 to 55% assuming that the total content of the polymer block (B) is 100%.

Since the above-described structure is employed, a resin composition excellent in shock resistance and toughness even under ultralow temperature conditions can be obtained.

It is noted that the term "ultralow temperature conditions" herein means −50° C. or less.

In the resin composition of the present invention, the modified block copolymer (I) (the component (I)) preferably satisfies the following condition (iv):

<Condition (iv)>

An amount of the alkenyl monomer unit (a1) resulting from hydrogenation of the unit (a) is 80% or more assuming that an amount of the 1,2-bond and/or 3,4-bond derived unit (a) in the polymer block (B) is 100%.

When the component (I) of the resin composition of the present embodiment satisfies the condition (iv), the component (I) is excellent in thermal stability. Therefore, at the time of modification and kneading with the component (II), rigidity increase of the component (I) and increase of the tan δ peak temperature otherwise caused by a side reaction described below can be suppressed, and a resin composition exhibiting high shock resistance and toughness even under ultralow temperature conditions can be obtained.

(Component (I))

The resin composition of the present embodiment contains the modified block copolymer (I) (hereinafter referred to also as the component (I)) that has the polymer block (A) mainly comprising a vinyl aromatic compound unit, and the polymer block (B) mainly comprising a conjugated diene compound unit, and has 0.01% by mass or more of a polar group.

A conjugated diene compound is a diolefin having a pair of conjugated double bonds.

Examples of the conjugated diene compound include, but are not limited to, 1,3-butadiene, 2-methyl-1,3-butadiene, isoprene, 2,3-dimethyl-1,3-butadiene, 1,3-pentadiene, 2-methyl-1,3-pentadiene, and 1,3-hexadiene. Among these, 1,3-butadiene and isoprene are preferred, and 1,3-butadiene is more preferred. 1,3-Butadiene and isoprene are widely used and easily available, and in addition, are advantageous in cost, and are easily copolymerized with styrene, which is widely used as a vinyl aromatic compound. Besides, in using 1,3-butadiene, a tan δ peak temperature described below can be most easily adjusted to that for ultralow temperature conditions.

One of these may be singly used, or two or more of these may be used in combination.

Herein, a conjugated diene compound unit refers to a constituent unit derived from the conjugated diene compound in a polymer produced through polymerization of the conjugated diene compound.

Examples of a vinyl aromatic compound include, but are not limited to, styrene, α-methylstyrene, p-methylstyrene, divinylbenzene, 1,1-diphenylethylene, N,N-dimethyl-p-aminoethylstyrene, and N,N-diethyl-p-aminoethylstyrene.

One of these may be singly used, or two or more of these may be used in combination.

A vinyl aromatic compound unit herein refers to a constituent unit derived from the vinyl aromatic compound in a polymer produced through polymerization of the vinyl aromatic compound.

In the resin composition of the present embodiment, the component (I) has 0.01% by mass or more of a polar group.

When the component (I) has 0.01% by mass or more of a polar group, affinity or reactivity with the component (II) described below is increased, resulting in obtaining a resin composition exhibiting excellent shock resistance and toughness under ultralow temperature conditions.

The "polar group" constituting the component (I) refers to an atomic group having charge bias between covalently bonded atoms.

In a covalent bond between heteroatoms, such as carbon-oxygen, carbon-nitrogen, carbon-halogen, oxygen-hydrogen, nitrogen-hydrogen, or silicon-hydrogen, charge bias is caused due to a difference in electronegativity between the atoms, and therefore, an atomic group including a heteroatom, such as oxygen, nitrogen, sulfur, phosphorus, or halogen, exhibits polarity in general.

The amount of the polar group to be added in the component (I) is preferably 0.01% by mass to 10% by mass, more preferably 0.01% by mass to 8.0% by mass, further preferably 0.05% by mass to 6.0% by mass, still more preferably 0.05% by mass to 5.0% by mass, and still further preferably 0.05% by mass to 4% by mass with respect to 100% by mass of the component (I).

When the amount of the "polar group" to be added to the component (I) is 0.01% by mass or more and 10% by mass or less, and preferably 0.01% by mass or more and 5% by mass or less, dispersibility with the component (II) described below is increased, resulting in obtaining a resin composition exhibiting excellent shock resistance and toughness under ultralow temperature conditions.

According to the finding by the present inventors, even when the amount of the polar group to be added with respect to 100% by mass of the component (I) exceeds 10% by mass, the performance of the component (I) is not directly deteriorated, but when a modified block copolymer having the content over 10% by mass is attempted to be produced, a side reaction such as cross-linkage tends to easily occur at the time of modification.

Under modification conditions where the amount of the polar group to be added with respect to 100% by mass of the component (I) is over 10% by mass, gelation easily occurs, and hence, when the component (I) is mixed with the component (II) described below to obtain a resin composition, there is a tendency that shock resistance and toughness are difficult to be exhibited under ultralow temperature conditions due to inhibition by a byproduct.

As a method for reducing the amount of the byproduct, a method in which filtration with a mesh or the like is performed after suppressing a resin temperature to a preferable temperature range described below, and after adding the polar group can be employed. In a melt kneading method described below, when the component (I) is caused to have the polar group, a method in which a mesh is inserted in a die portion of an extruder is preferably performed, and when a reaction is performed after dissolving or dispersing/mixing the component in a solvent or the like, a method in which a solution resulting from the reaction is filtered through a mesh, or a method in which an extruder is used after removing the solvent to filter the resultant through a mesh in the same manner as in the melt kneading method is preferably performed.

A method in which a stabilizer such as various phenol-based stabilizers, phosphorus-based stabilizers, sulfur-based stabilizers, and amine-based stabilizers is added to an extent where a reaction between the polymer and the polar group is not inhibited at the time of the production of the component (I) can be the method for reducing the amount of the byproduct.

Furthermore, in employing modification conditions where the amount of the polar group to be added is over 5% by mass, the resin temperature is suppressed to the preferable temperature range described below from the viewpoint of reducing the byproduct caused by the gelation described above, and productivity is extremely lowered because exchange frequency of the inserted mesh tends to be abruptly increased, and therefore, the amount of the polar group to be added is practically preferably controlled to attain appropriate exchange frequency.

As a method for causing the component (I) to have the polar group, any of known methods can be applied, and the method is not especially limited. Examples include a melt kneading method, and a method in which respective components are dissolved or dispersed/mixed in a solvent or the like to cause a reaction. Alternatively, a method in which polymerization is performed by anionic living polymerization using a polymerization initiator having a functional group or an unsaturated monomer having a functional group, a method in which a functional group is formed at the living end, or a method in which a modifier having a functional group is addition-reacted may be applied, but the melt kneading method is preferred.

In the component (I), the amount of the polar group to be added is preferably 10% by mass or less, and more preferably 5% by mass or less, and therefore, in the melt kneading method, the resin temperature is controlled to preferably 130° C. or more, more preferably 150° C. or more, and further preferably 160° C. or more at the time of melt kneading. An upper limit of the resin temperature at the time of melt kneading is preferably 280° C. or less, more preferably 260° C. or less, and further preferably 250° C. or less.

In the component (I), an amount of a modifier to be added in adding the polar group is, assuming that the amount of the block copolymer is 100 parts by mass, preferably 10 parts by mass or less, more preferably 7 parts by mass or less, further preferably 5.5 parts by mass or less, and still more preferably 3.5 parts by mass or less from the viewpoint of controlling the amount of the polar group to be added to preferably 10% by mass or less, and more preferably 5% by mass or less, with the resin temperature controlled to the preferable range.

In adding the polar group to the component (I), when it is dissolved or dispersed/mixed in a solvent or the like to cause a modification reaction, or when a method for addition-reacting to the living end by anionic living polymerization is performed, a reaction temperature is set preferably to 250° C. or less, and more preferably 200° C. or less. Besides, when a reaction rate between the modifier and the component (I) at an arbitrary reaction temperature is calculated, the amount of the polar group to be added can be controlled to 10% by mass or less, and preferably 5% by mass or less by adjusting a reactive site of the component (I) and the amount of the modifier to an appropriate ratio.

An example of the "polar group" includes, but is not limited to, an atomic group containing at least one functional group selected from the group consisting of a hydroxyl group, a carboxyl group, a carbonyl group, a thiocarbonyl group, an acid halide group, an acid anhydride group, a carboxylic acid group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, a silanol group, an alkoxy silicon group, a tin halide group, a boronic acid group, a boron-containing group, a boronate group, an alkoxy tin group, and a phenyl tin group.

In particular, an atomic group containing at least one functional group selected from the group consisting of an acid anhydride group, a carboxylic acid group, a hydroxyl group, an epoxy group, an amino group, an amide group, a silanol group, and an alkoxy silane group is preferred, an atomic group containing at least one functional group selected from the group consisting of an acid anhydride group, a carboxylic acid group, a hydroxyl group, an epoxy group, an amino group, and an amide group is more preferred, and an atomic group containing at least one functional group selected from the group consisting of an acid anhydride group, a carboxylic acid group, and a hydroxyl group is further preferred. When an acid anhydride is bonded to the block copolymer in a process for forming the polar group, a reaction is caused between moisture or the like in the air and the acid anhydride, and thus a part may be formed as a carboxylic acid group, but the amount is not especially limited. Specifically, the term "at least one functional group selected from the group consisting of an acid anhydride group, a carboxylic acid group, and a hydroxyl group" used herein intends to encompass an aspect in which after adding an acid anhydride group as the polar group in the modification process, the acid anhydride is positively or unintentionally hydrated to be changed into a carboxylic acid group or a hydroxyl group.

The "polar group" can be formed with a modifier.

Examples of the modifier include, but are not limited to, tetraglycidyl methaxylene diamine, tetraglycidyl-1,3-bisaminomethylcyclohexane, ε-caprolactone, δ-valerolactone, 4-methoxybenzophenone, γ-glycidoxyethyltrimethoxysilane, γ-glycidoxypropyltrimethoxysilane, γ-glycidoxypropyldimethylphenoxysilane, bis(γ-glycidoxypropyl) methylpropoxysilane, 1,3-dimethyl imidazolidinone, 1,3-diethyl-2-imidazolidinone, N,N'-dimethylpropyleneurea, N-methylpyrrolidone, maleic acid, maleic anhydride, maleic anhydride imide, fumaric acid, itaconic acid, acrylic acid, methacrylic acid, glycidylmethacylic acid ester, and crotonic acid.

An example of another method for forming the "polar group" in the component (I) includes a method in which a reaction (metalation reaction) of a block copolymer with an organic alkali metal compound such as an organolithium compound is performed, and a modifier having a functional group is addition-reacted with the resultant block polymer to which an organic alkali metal has been added.

A portion of the component (I) having the "polar group" is preferably the polymer block (B) constituting the component (I).

Being bonded to the polymer block (B) refers to a state where the polar group is bonded through an addition reaction to a double bond contained in the polymer block (B). The polymer block (B) contains a double bond derived from conjugated diene even after a hydrogenation reaction, and when a method for kneading a compound having a polar group with the block copolymer, for example, is performed in the melt kneading process, a modified block copolymer containing the polar group in the polymer block (B) can be obtained.

If the polymer block (B) is present at the end of the block copolymer, the polymer block (B) is caused to have the polar group also when a polymerization initiator having a functional group is reacted, or when a modifier having a functional group is reacted with the living end of the block copolymer, but the present embodiment does not encompass such a state where the polar group is bonded to a conjugated diene compound unit at the end.

When the "polar group" is added to the polymer block (B) of the block copolymer, compatibility between the component (II) described below and the component (I) tends to be excellent, and shock resistance and toughness under ultralow temperature conditions tend to be improved.

Examples of a method for checking the position where the "polar group" is bonded include a method for performing analysis with a nuclear magnetic resonance apparatus, and a method in which a residual double bond of the polymer block (B) is decomposed by an appropriate method to be measured by matrix-assisted laser desorption/ionization or the like.

The component (I) is a hydrogenated product of the modified block copolymer having the polymer block (A) mainly comprising a vinyl aromatic compound unit and the polymer block (B) mainly comprising a conjugated diene compound unit.

The polymer block (A) constituting the component (I) mainly comprises a vinyl aromatic compound unit.

Here, the term "to mainly comprise" refers to that a content of the vinyl aromatic compound unit is 70% by mass or more with respect to the total mass of the polymer block (A).

The content of the vinyl aromatic compound unit in the polymer block (A) is, with respect to the total mass of the polymer block (A), preferably 80% by mass or more, more preferably 90% by mass or more, and further preferably 100% by mass (with no other monomer intentionally added).

The polymer block (B) constituting the component (I) mainly comprises a conjugated diene compound unit.

Here, the term "to mainly comprise" refers to that a content of the conjugated diene compound unit is 70% by mass or more with respect to the total mass of the polymer block (B).

The content of the conjugated diene compound unit in the polymer block (B) is, with respect to the total mass of the polymer block (B), preferably 80% by mass or more, more preferably 90% by mass or more, and further preferably 100% by mass.

The content of the polymer block (A) in the component (I) can be obtained in accordance with the following expression by using the mass of block components of the vinyl aromatic compound (excluding a block component of a vinyl aromatic compound having an average degree of polymerization of about 30 or less) obtained by, for example, a method in which osmium tetroxide is used as a catalyst for oxidatively decomposing a block copolymer before hydrogenation with tertiary butyl hydroperoxide (method described by I. M. KOLTHOFF, et al., J. Polym. Sci. 1, 429 (1946)):

Content (mass %) of polymer block (A)=(mass of block components of vinyl aromatic compound in block copolymer before hydrogenation/mass of block copolymer before hydrogenation)×100

The component (I) may be a block copolymer using the polymer block (A) and the polymer block (B) as basic skeletons, and having a repeating structure of these basic skeletons.

Alternatively, the component (I) may be a block copolymer obtained by coupling the basic skeletons of the polymer block (A) and the polymer block (B).

The modified block copolymer (I) contained in the resin composition of the present embodiment satisfies the following conditions (i) to (iii):

<Condition (i)>

The content of the vinyl aromatic compound unit in the modified block copolymer (I) is 1 to 30% by mass.

When the content of the vinyl aromatic compound unit in the modified block copolymer (I) is 30% by mass or less, it is possible to obtain an effect that the resultant copolymer is in a rubber state and has low rigidity under ultralow temperature conditions to be excellent in shock resistance and toughness.

The content of the vinyl aromatic compound unit in the modified block copolymer (I) is preferably 3 to 28% by mass, more preferably 5 to 27% by mass, and further preferably 7 to 25% by mass.

When the content of the vinyl aromatic compound unit in the modified block copolymer (I) is 1% by mass or more, excellent processability is obtained.

The content of the vinyl aromatic compound unit in the modified block copolymer (I) can be controlled to fall in the above-described numerical range by adjusting polymerization conditions such as an amount of a monomer to be added, timing of the addition, and a polymerization temperature.

<Condition (ii)>

The polymer block (B) contains a 1,2-bond and/or 3,4-bond derived unit (a), and a 1,4-bond derived unit (b), and a content of the 1,2-bond and/or 3,4-bond derived unit (a) is 1 to 55% assuming that the total content of the polymer block (B) is 100%.

<Condition (iii)>

The polymer block (B) contains an alkenyl monomer unit (a1) resulting from hydrogenation of the 1,2-bond and/or 3,4-bond derived unit (a) (an alkenyl monomer unit that is the 1,2-bond and/or 3,4-bond derived unit, and has been hydrogenated), and an alkenyl monomer unit (b1) resulting from hydrogenation of the 1,4-bond derived unit (b) (an alkenyl monomer unit that is the 1,4-bond derived unit (b), and has been hydrogenated), and a total content of the alkenyl monomer unit (a1) and the alkenyl monomer unit (b1) is 5 to 55% assuming that the total content of the polymer block (B) is 100%.

In general, shock resistance and toughness are imparted to a resin having high rigidity such as engineering plastics by dispersing a prescribed elastomer therein because a void is formed, by applying impact or stretching, on an interface between the resin and an elastomer particle component dispersed therein or in the elastomer particle itself, and thus shear yielding is caused in the matrix resin from the elastomer particle to cause stress relaxation.

At this point, when the rigidity of the elastomer particle against the matrix resin is lower, the stress is concentrated on the interface. Therefore, in order to exhibit a high modification effect even under ultralow temperature conditions, it is required to reduce the rigidity of the elastomer component under ultralow temperature conditions. Accordingly, in order to exhibit high shock resistance and toughness under ultralow temperature conditions, it is significant that the elastomer component is in a rubber state with low rigidity at the temperature.

Whether or not an elastomer is in a rubber state under a given temperature condition can be approximately discriminated depending on a temperature at which micro-Brownian motion (primary dispersion) of its main chain occurs, namely, a primary dispersion peak temperature of a tan δ curve in a viscoelastic spectrum, and at a temperature higher than the primary dispersion peak temperature, the elastomer is in a rubber state.

A tan δ curve in a viscoelastic spectrum can be measured by a method described in examples below, and in the resin composition of the present embodiment, at least one tan δ peak temperature derived from the polymer block (B) is present preferably at –55° C. or less, more preferably at –60° C. or less, and further preferably at –65° C. or less.

The tan δ peak temperature is determined mainly by a binding state and an amount of hydrogenation of the polymer block (B) mainly comprising a conjugated diene compound unit.

The primary dispersion peak of the tan δ curve in the viscoelastic spectrum of the modified block copolymer (I) constituting the resin composition of the present invention is present preferably at –55° C. or less, more preferably at –60° C. or less, and further preferably at –65° C. or less.

The "primary dispersion peak of the tan δ curve" refers to a maximum value of the tan δ curve before melting in movement of a main chain in the molecular structure. When the temperature at the maximum value is –55° C. or less, shock resistance and toughness under ultralow temperature conditions are excellent.

The "primary dispersion peak of the tan δ curve" can be measured by a method described in the examples below.

The polymer block (B) contains the 1,2-bond and/or 3,4-bond derived unit (a) and the 1,4-bond derived unit (b), and assuming that the total content of the polymer block (B) is 100%, the content of the unit (a) is 55% or less. Thus, the primary dispersion peak temperature of the tan δ curve of the modified block copolymer (I) can be controlled to –55° C. or less. From the viewpoint of processability, the content of the unit (a) is 1% or more.

Assuming that the total content of the polymer block (B) is 100%, the content of the unit (a) is preferably 5 to 50%, more preferably 10 to 45%, and further preferably 15 to 40%.

The content of the unit (a) can be controlled by using an adjuster of a polar compound or the like at the time of the polymerization of the component (I).

As the adjuster, for example, a tertiary amine compound or an ether compound can be added, and a tertiary amine compound is preferably used.

A tertiary amine compound is a compound represented by general formula, $R^1R^2R^3N$ (wherein $R^1$, $R^2$, and $R^3$ each represent a hydrocarbon group having 1 to 20 carbon atoms, or a hydrocarbon group having a tertiary amino group).

Examples of the tertiary amine compound include, but are not limited to, trimethylamine, triethylamine, tributylamine, N,N,-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine.

The polymer block (B) of the modified block copolymer (I) contains the alkenyl monomer unit (a1) resulting from hydrogenation of the 1,2-bond and/or 3,4-bond derived unit (a), and the alkenyl monomer unit (b1) resulting from hydrogenation of the 1,4-bond derived unit (b), and the total content of the alkenyl monomer unit (a1) and the alkenyl monomer unit (b1) is 5 to 55% assuming that the total content of the polymer block (B) is 100%.

When the total content of the alkenyl monomer unit (a1) and the alkenyl monomer unit (b1) is 55% or less, the primary dispersion peak temperature of the tan δ curve of the modified block copolymer (I) can be controlled to –55° C. or less.

Besides, when the total content is 1% or more, excellent thermal stability can be obtained.

The total content of the alkenyl monomer unit (a1) and the alkenyl monomer unit (b1) in the polymer block (B) is preferably 5 to 50%, more preferably 10 to 45%, and further preferably 15 to 40%.

The total content of the alkenyl monomer unit (a1) and the alkenyl monomer unit (b1) in the polymer block (B) can be controlled to fall in the above-described numerical range by adjusting a reaction temperature, a reaction time, a hydrogen supply amount, an amount of a catalyst and the like timely in a hydrogenation method described below.

A method for hydrogenating the modified block copolymer (I) is not especially limited, and any of conventionally known methods can be applied.

As a hydrogenation catalyst, (1) a supported heterogeneous hydrogenation catalyst in which a metal such as Ni, Pt, Pd, or Ru is supported on carbon, silica, alumina, diatomaceous earth, or the like, (2) what is called a Ziegler hydrogenation catalyst using an organic acid salt of Ni, Co, Fe, Cr, or the like or a transition metal salt such as acetylacetone salt, and a reductant such as organic aluminum, or (3) a monogenous hydrogenation catalyst of what is called an organic metal complex or the like of an organic metal compound or the like of Ti, Ru, Rh, Zr or the like is used.

As the hydrogenation catalyst, specifically, hydrogenation catalysts described in Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, and Japanese Patent Publication No. 2-9041 can be used.

Preferable examples of the hydrogenation catalyst include a titanocene compound and/or a reducing organic metal compound.

As the titanocene compound, a compound described in Japanese Patent Laid-Open No. 8-109219 can be used. Examples of the titanocene compound include compounds having at least one or more ligands having a (substituted) cyclopentadienyl skeleton, such as biscyclopentadienyl titanium dichloride or monopentamethyl cyclopentadienyl titanium trichloride, an indenyl skeleton, or a fluorenyl skeleton. The titanocene compound may include single one of or a combination of two of these skeletons.

Examples of the reducing organic metal compound include an organic alkali metal compound such as organolithium, an organic magnesium compound, an organic aluminum compound, an organic boron compound, and an organic zinc compound.

One of these hydrogenation catalysts may be singly used, or two or more of these may be used in combination.

As described above, it is significant that the modified block copolymer (I) is in a rubber state and has low rigidity under ultralow temperature conditions.

When the content of the vinyl aromatic compound unit in the modified block copolymer (I) is 30% by mass or less, the resultant copolymer is in a rubber state with low rigidity under ultralow temperature conditions, and excellent shock resistance and toughness can be obtained.

The modified block copolymer (I) contained in the resin composition of the present embodiment preferably satisfies the following condition (iv):

<Condition (iv)>

An amount of the alkenyl monomer unit (a1) resulting from hydrogenation of the 1,2-bond and/or 3,4-bond derived unit (a) is 80% or more assuming that an amount of the unit (a) in the polymer block (B) mainly comprising a conjugated diene compound unit is 100%.

The "resin (II) having a polar group" constituting the resin composition of the present embodiment has a polar group, and hence a melting temperature thereof is high from the viewpoint of entropy and enthalpy.

Besides, the component (I) has the polar group as described above, and in bonding the "polar group" to the block copolymer by the melt kneading method, it is melted at a high temperature, and subjected to shear. Accordingly, a side reaction such as cross-linkage is caused through exposure to the high temperature, and rigidity increase or increase of the tan δ peak temperature occurs, which may deteriorate shock resistance and toughness under ultralow temperature conditions.

In other words, the tan δ peak temperature tends to be shifted to a high temperature side due to occurrence of a side reaction such as cross-linkage at the time of the modification, and hence the increase of the tan δ peak temperature is preferably suppressed by setting high a vinyl hydrogenation rate in the component (I).

From the viewpoint of suppressing the increase of the tan δ peak temperature, the tan δ peak temperature of the "modified block copolymer" constituting the component (I) has an increment of the tan δ peak temperature, as compared with the tan δ peak temperature of an "unmodified block copolymer" before bonding the polar group, of preferably 10° C. or less, more preferably 7° C. or less, further preferably 5° C. or less, and still more preferably 3° C. or less.

The "1,2-bond and/or 3,4-bond derived unit (a)" constituting the component (I) has a double bond on a side chain, and hence it is presumed that the above-described side reaction is more easily caused than in the "1,4-bond derived unit (b)".

Therefore, from the viewpoints of suppressing the rigidity increase and the increase of the tan δ peak temperature caused by the side reaction, and sufficiently exhibiting shock resistance and toughness under ultralow temperature conditions, a hydrogenation rate of the "1,2-bond and/or 3,4-bond derived unit (a)", namely, a ratio of the content of the alkenyl unit (a1) assuming that the content of the unit (a) is 100%, is preferably 80% or more, more preferably 83% or more, and further preferably 85% or more.

When the total content of the alkenyl unit (a1) and the alkenyl unit (b1) is equal to or smaller than the content of the 1,4-bond derived unit (b), the content of the alkenyl unit (b1) in the total amount of the alkenyl units (a1) and (b1) is preferably 80% or more, more preferably 85% or more, and further preferably 90% or more.

Thus, the rigidity increase and the increase of the tan δ peak temperature caused by the side reaction are suppressed, so as to exhibit excellent shock resistance and toughness under ultralow temperature conditions.

From the viewpoint that the hydrogenation rate of the unit (a), namely, the ratio of the content of the alkenyl unit (a1) assuming that the content of the unit (a) is 100%, is controlled to 80% or more, a temperature at the time of the hydrogenation reaction is preferably 55 to 200° C., more preferably 60 to 170° C., further preferably 65° C. to 160° C., and still more preferably 70° C. to 150° C.

Besides, a pressure of hydrogen used in the hydrogenation reaction is preferably 0.1 to 15 MPa, more preferably 0.2 to 10 MPa, and further preferably 0.3 to 5 MPa.

A hydrogenation reaction time is usually 3 minutes to 10 hours, and preferably 10 minutes to 5 hours.

The hydrogenation reaction may be performed by a batch process, a continuous process, or a combination of these.

In the resin composition of the present embodiment, the component (I) preferably satisfies the following <Condition (v)>:

<Condition (v)>

A b value obtained by measuring, with a color-difference meter, a sheet with a thickness of 2 mm obtained by compression molding the component (I) is 30 or less.

The condition (v) is a condition set with attention paid to that the color of the component (I) affects the performance of the resin composition of the present embodiment, and therefore, the b value measured in the sheet molded from the component (I) alone is used as an index.

For coloring the resin composition depending on usage of the resin composition of the present embodiment, the component (I) may be colored, at a previous stage to the process for mixing the component (I) and the component (II), by adding, as a component (III) described below, a pigment such as carbon black or titanium oxide and/or a colorant to the component (I) in some cases. Even in such cases, since the condition (v) uses the b value of the sheet of the component (I) not containing a coloring component, the sheet with a thickness of 2 mm for measuring the b value is molded before adding the coloring component, or the component (III) needs to be removed before producing the sheet. The b value of the component (I) is measured without adding the pigment and/or the colorant or the like.

A method for removing a coloring component from a resin composition containing the coloring component is not limited, and an example includes a reprecipitation method. When the pigment or colorant is an organic substance, an inorganic substance or the like, and dissolves in a poor solvent of the component (I) such as methanol or ethanol, a mixture of the component (I) and the component (III) described below is dissolved in a good solvent such as toluene, cyclohexane, or xylene in a concentration of 20% by mass or less, the resultant is carefully dropped into a poor solvent in a 50-fold or more amount of the good solvent, and thus, the pigment or colorant can be separated. Alternatively, when the pigment or colorant is a fine particle of carbon black or the like and/or the component (I) has low solubility in a poor solvent, it may be difficult to remove the pigment or colorant by the reprecipitation method, and therefore, a removal process by centrifugation, filtration using various filters appropriate to a particle size of the additive, or separation using an appropriate column highly interacting with the additive can be employed together and/or singly employed.

When the b value of the sheet with a thickness of 2 mm of the component (I) is 30 or less, the resin composition of the present embodiment obtained by mixing with the component (II) attains good appearance and coloring property, and there is a tendency that the coloring component described below can be prevented from deteriorating toughness and shock resistance under ultralow temperature conditions. From this point of view, the b value of the sheet with a thickness of 2 mm of the component (I) is controlled to preferably 30 or less, more preferably 25 or less, further preferably 23 or less, and still more preferably 20 or less.

In production of the component (I), the coloring component of the component (I) and generation mechanism thereof are not limited to the following, and the component is known to be generally colored with, as a chromophore, a chromophore structure having an unsaturated bond such as >C=O, —N=N—, or —N=O, or an auxochrome structure such as —OR, —OH, —NH$_2$, —NHR, —SO$_3$H, or —COOH. These structures, similar structures, a structure presumed to be generated through a reaction with oxygen, nitrogen and the like in the air, and a structure presumed to be generated through thermal decomposition and the like are largely contained in a general antioxidant, and a modifier described below.

Besides, when an antioxidant is changed, through a reaction with oxygen, nitrogen or the like in the air, to have a chromophore structure or an auxochrome structure, an effect of suppressing the side reaction such as cross-linkage is reduced, the increase of the tan δ peak temperature cannot be suppressed, and hence sufficient toughness and shock resistance under ultralow temperature conditions tend to be deteriorated. Alternatively, when a modifier is changed, through a reaction with oxygen, nitrogen or the like in the air, to have a chromophore structure or an auxochrome structure, compatibility between the component (I) and the component (II) is changed, and hence sufficient toughness and shock resistance under ultralow temperature conditions tend to be deteriorated.

Therefore, an amount of the modifier to be added in the component (I) is, with respect to the component (I), preferably 10% by mass or less, more preferably 7% by mass or less, further preferably 5.5% by mass or less, and still more preferably 3.5% by mass or less from the viewpoints of reducing the generation of the above-described coloring component, and attaining the b value of the sheet with a thickness of 2 mm of the component (I) of 30 or less.

When the amount of the modifier is 10% by mass or less, there is a tendency that the modifier can be inhibited from changing to a coloring component in imparting the polar group, and that the b value of the modified block copolymer (I) can be prevented from increasing.

Besides, the resin composition of the present embodiment may contain at least one stabilizer as described below. An amount of the stabilizer to be added is, assuming that the content of the component (I) is 100% by mass, preferably 6% by mass or less, more preferably 5% by mass or less, further preferably 4% by mass or less, and still more preferably 3% by mass or less from the viewpoints of reducing the generation of the above-described coloring component, and attaining the b value of the sheet with a thickness of 2 mm of the component (I) of 30 or less. When the content of the stabilizer is 6% by mass or less, there is a tendency that the modifier can be inhibited from changing into the coloring component in imparting the polar group to the component (I), and that the b value of the modified block copolymer (I) can be prevented from increasing.

In particular, when the resin composition of the present embodiment uses a stabilizer and a modifier containing an aromatic ring, if a residual metal of a polymerization initiator for the block copolymer and a catalyst residue caused in the hydrogenation reaction are coordinated to the aromatic ring to lower an electron density, the reactivity of a compound of the stabilizer or modifier is improved to be reacted with oxygen or the like in the air, and as a result, the coloring component containing the chromophore and/or the auxochrome tends to be easily generated. Therefore, in order to attain the b value of the sheet with a thickness of 2 mm of the component (I) of 30 or less, the amount of the residual metal of the polymerization initiator or the catalyst residue is preferably 120 ppm or less, more preferably 80 ppm or less, further preferably 70 ppm or less, and still more preferably 50 ppm or less.

When the amount of the residual metal is 120 ppm or less, there is a tendency that the stabilizer and/or the modifier can be inhibited from changing into the coloring component in imparting the polar group to the component (I), and that the b value of the modified block copolymer can be prevented from increasing.

Besides, when the resin temperature is suppressed to a preferable temperature range described below in the production process of the component (I), and the filtration through a mesh or the like is performed after adding the polar group in order to reduce the amount of the above-described byproduct, there is a tendency that the exchange frequency of the mesh can be reduced to improve productivity by controlling the amount of the residual metal to fall in the preferable range.

A component of the residual metal is not especially limited, and examples include Ti, Li, Mg, Fe, and compounds containing these metals.

A method for removing the residual metal component is not especially limited but any of conventionally known methods can be applied, and examples include, but are not limited to, a method in which water and carbon dioxide gas are added after performing the hydrogenation reaction of the block copolymer to neutralize a hydrogenation catalyst residue; and a method in which an acid is added in addition to water and carbon dioxide gas to neutralize a hydrogenation catalyst residue, and specifically, a method described in Japanese Patent Application No. 2014-557427 can be a preferable method.

In the process for obtaining the modified block copolymer (I), the resin temperature of the component (I) is controlled to preferably 130° C. to 280° C. or less from the viewpoints of reducing the generation of the above-described coloring component, and controlling the b value of the sheet with a thickness of 2 mm to 30 or less. It is presumed that the generation of the coloring component is particularly affected by a reaction performed at a high temperature, and hence, the upper limit is more preferably 260° C. or less, and further preferably 250° C. or less. The lower limit of the resin temperature may be set from the viewpoint of ensuring the productivity of the component (I), for example, and is preferably 150° C. or more, and more preferably 160° C. or more in accordance with, for example, the reactivity and the amount to be added of the polar group.

The resin temperature refers to a temperature of the component (I) in a melted state in a desolvation process, and can be measured by contacting an arbitrary thermometer or temperature sensor with the resin.

In particular, when the polar group is imparted to the block copolymer as the modification process in the melt kneading method described above, the resin temperature in an extruder measured by a method described in the examples is preferably 130° C. to 280° C. or less, and the upper limit is preferably 260° C. or less, and more preferably 250° C. or less as described above. The lower limit is preferably 150° C. or more, and more preferably 160° C. or more.

Besides, a conjugated double bond is known as a general coloring mechanism. Therefore, when a modifier containing a double bond is used, if the above-described polar group is added as the modification process in the melt kneading method, from the viewpoint of preventing a residual double bond in a conjugated diene polymer block of a hydrogenated block copolymer from being thermally decomposed to become a conjugated double bond for coloring, the temperature of the hydrogenated block copolymer is preferably 130° C. to 280° C. or less, more preferably 150 to 260° C. or less, and further preferably 160 to 250° C. or less.

In the resin composition of the present embodiment, the component (I) preferably satisfies the following
<Condition (vi)>:
<Condition (vi)>

When 5 g of the component (I) is dissolved in 200 mL of toluene, the resultant is suction filtered through filter paper (thickness: 0.2 mm, maximum diameter: 6 μm, filtering efficiency: 65%), and the resultant is sufficiently dried, an amount of a component remaining on the filter paper calculated based on a mass difference between the filter paper after the filtration and the filter paper before the filtration is 0.30 g or less.

The component remaining on the filter paper is presumed as a cross-linked component generated through complicated reaction between block copolymers and reaction between the block copolymers via a modifier in the desolvation process after the polymerization of the block copolymer and/or the modification process of the block copolymer under melt kneading. When the cross-linked component is contained in the component (I), the rigidity tends to increase under ultralow temperature conditions, and toughness and shock resistance under ultralow temperature conditions tend to be deteriorated.

The amount of the component remaining on the filter paper in the filtration is preferably 0.3 g or less, more preferably 0.25 g or less, further preferably 0.2 g or less, and still more preferably 0.15 g or less.

Since it is presumed that the above-described side reaction is accelerated under a high temperature state and/or in the coexistence with a large amount of the modifier in the process for obtaining the modified block copolymer (I), particularly in imparting the polar group to the block copolymer in the melt kneading method, it is preferable to control the resin temperature and/or the amount of the modifier in the same ranges as in those in the condition (v) described above. When, however, the amount of the component remaining on the filter paper in the filtration exceeds 0.3 g even if the condition (v) is satisfied, for example, when the amount of the residual metal is very small, there is tendency that toughness and shock resistance under ultralow temperature conditions are not sufficiently exhibited.

Besides, even if the cross-linked component is removed through the mesh or the like as described above, and the amount of the component remaining on the filter paper is 0.3 g or less, when the condition (v) is not satisfied, there is a tendency that toughness and shock resistance under ultralow temperature conditions are deteriorated.

In other words, from the viewpoints of inhibiting the above-described side reaction and suppressing the cross-linked component, the resin temperature is preferably 130° C. to 280° C. or less in the process for obtaining the modified block copolymer (I).

It is presumed that the generation of the cross-linked component is particularly affected by a reaction performed under a high temperature condition, and hence, the upper limit of the resin temperature is more preferably 260° C. or less, and further preferably 250° C. or less. The lower limit of the resin temperature may be set from the viewpoint of, for example, ensuring the productivity, and is set to preferably 150° C. or more, and more preferably 160° C. or more in accordance with, for example, the reactivity and the amount to be added of the polar group.

The resin temperature refers to a temperature of the component (I) in a melted state in the desolvation process, and can be measured by contacting an arbitrary thermometer or temperature sensor with the resin.

In particular, when the polar group is imparted to the block copolymer in the above-described melt kneading method, the resin temperature in an extruder measured by a method described in the examples below is preferably 130° C. to 280° C. or less, and the upper limit is preferably 260° C. or less, and more preferably 250° C. or less as described above. The lower limit is preferably 150° C. or more, and more preferably 160° C. or more.

Besides, from the viewpoint of suppressing the cross-linked component generated via the modifier, the amount of the modifier to be added is, with respect to 100 parts by mass of the component (I), preferably 10 parts by mass or less, more preferably 7 parts by mass or less, further preferably 5.5 parts by mass or less, and still more preferably 3.5 parts by mass or less. When the amount of the modifier is 10 parts by mass or less, increase of the cross-linked component of the block copolymer via the modifier can be inhibited in imparting the polar group.

A weight average molecular weight of the modified block copolymer (I) (component (I)) is preferably $5\times10^3$ to $1\times10^6$, more preferably $1\times10^4$ to $5\times10^5$, further preferably $3\times10^4$ to $3\times10^5$, and still more preferably $5\times10^4$ to $2\times10^5$.

When the weight average molecular weight of the modified block copolymer (I) is $5\times10^3$ or more, shock resistance under ultralow temperature conditions tends to be excellent. When the weight average molecular weight is $5\times10^5$ or less, molding processability tends to be excellent.

From the viewpoints of increasing molding processability, and attaining excellent shock resistance and toughness under ultralow temperature conditions, a molecular weight distribution of the modified block copolymer (I) is preferably 1.00 or more, more preferably 1.0 or more, and further preferably 1.04 or more as the lower limit. The upper limit is preferably 5.0 or less, more preferably 4.5 or less, and further preferably 4.0 or less.

(Method for Producing Component (I))

The modified block copolymer (I) can be obtained, for example, by performing anionic living polymerization in a hydrocarbon solvent using a polymerization initiator such as an organic alkali metal compound.

Examples of the hydrocarbon solvent include aliphatic hydrocarbons such as n-butane, isobutane, n-pentane, n-hexane, n-heptane, and n-octane; alicyclic hydrocarbons such as cyclohexane, cycloheptane, and methylcycloheptane; and aromatic hydrocarbons such as benzene, toluene, xylene, and ethylbenzene.

Examples of the polymerization initiator include organic alkali metal compounds generally known to have anionic polymerization activity against a conjugated diene compound and a vinyl aromatic compound, such as an aliphatic hydrocarbon alkali metal compound, an aromatic hydrocarbon alkali metal compound, and an organic amino alkali metal compound. Examples of the alkali metal include lithium, sodium and potassium.

Examples of the organic alkali metal compound include aliphatic and aromatic hydrocarbon lithium compounds having 1 to 20 carbon atoms, which encompass a compound containing one lithium in one molecule, and a dilithium compound, a trilithium compound, and a tetralithium compound each containing a plurality of lithiums in one molecule.

Specific examples of the organic alkali metal compound include n-propyllithium, n-butyllithium, sec-butyllithium, tert-butyllithium, n-pentyllithium, n-hexyllithium, benzyllithium, phenyllithium, tolyllithium, a reaction product of diisopropenylbenzene and sec-butyllithium, and a reaction product of divinylbenzene, sec-butyllithium, and a small amount of 1,3-butadiene. In addition, 1-(t-butoxy)propyllithium and a lithium compound into which one to several molecules of an isoprene monomer is inserted for improving the solubility thereof disclosed in U.S. Pat. No. 5,708,092, a siloxy group-containing alkyllithium such as 1-(t-butyldimethylsiloxy)hexyllithium disclosed in U.K. Patent No. 2,241,239, amino group-containing alkyllithium disclosed in U.S. Pat. No. 5,527,753, and amino lithiums such as lithium diisopropylamide, and lithium hexamethyldisilazide can be used.

As a method for polymerizing a vinyl aromatic compound and a conjugated diene polymer with the organic alkali metal compound used as the polymerization initiator, any of conventionally known methods can be applied.

Examples of a polymerization method include batch polymerization, continuous polymerization, and polymerization through a combination of these, and any one of these may be employed. In particular, in order to obtain a block copolymer excellent in heat resistance, batch polymerization is suitably employed.

A polymerization temperature is preferably 0° C. to 180° C., and more preferably 30° C. to 150° C. A polymerization time varies depending on conditions, and is usually within 48 hours, and preferably 0.1 to 10 hours. As an atmosphere in the polymerization system, an inert gas atmosphere of nitrogen gas or the like is preferred. A polymerization pressure may be set to a pressure range with which a monomer and a solvent can be retained in a liquid phase in the above-described temperature range, and is not especially limited. Besides, it is necessary to pay attention not to cause an impurity that inactivates a catalyst and a living polymer, such as water, oxygen, and carbon dioxide gas, to enter the polymerization system.

Besides, when the polymerization process is completed, a coupling reaction may be performed by adding a necessary amount of a bifunctional or higher functional coupling agent.

The bifunctional coupling agent is not especially limited, and any of conventionally known ones can be applied.

Examples of the bifunctional coupling agent include alkoxysilane compounds such as trimethoxysilane, triethoxysilane, tetramethoxysilane, tetraethoxysilane, dimethyldimethoxysilane, diethyldimethoxysilane, dichlorodimethoxysilane, dichlorodiethoxysilane, trichloromethoxysilane, and trichloroethoxysilane, dihalogen compounds such as dichloroethane, dibromoethane, dimethyldichlorosilane, and dimethyldibromosilane, and acid esters such as methyl benzoate, ethyl benzoate, phenyl benzoate, and phthalic acid esters.

A trifunctional or higher functional coupling agent is not especially limited, and any of conventionally known ones can be applied. Examples of the trifunctional or higher functional coupling agent include tri- or higher valent polyalcohols, polyvalent epoxy compounds such as epoxidized soybean oil, diglycidyl bisphenol A, and 1,3-bis(N—N'-diglycidylaminomethyl)cyclohexane, a halogenated silicon compound represented by general formula, $R_4\text{-}nSiX_n$ (wherein R represents a hydrocarbon group having 1 to 20 carbon atoms, X represents a halogen, and n represents an integer of 3 to 4), for example, methylsilyl trichloride, t-butylsilyl trichloride, silicon tetrachloride, and bromides of these, and a halogenated tin compound represented by general formula $R_4\text{-}nSnX_n$ (wherein R represents a hydrocarbon group having 1 to 20 carbon atoms, X represents a halogen, and n represents an integer of 3 to 4), for example, polyvalent halogen compounds such as methyltin trichloride, t-butyltin trichloride, and tin tetrachloride.

Alternatively, dimethyl carbonate, diethyl carbonate or the like may be used.

From a solution of the modified block copolymer (I) obtained as described, the catalyst residue is removed if necessary, and the modified block copolymer (I) can be separated from the solution.

Examples of a solvent separation method include a method in which a polar solvent that can be a poor solvent for a hydrogenated copolymer, such as acetone or alcohol, is added to a reaction solution after the hydrogenation so as to collect the polymer by precipitation, a method in which the reaction solution is put into boiling water under stirring to remove the solvent by steam stripping for the collection, and a method in which the polymer solution is directly heated to distill the solvent off. It is noted that a stabilizer such as various phenol-based stabilizers, phosphorus-based stabilizers, sulfur-based stabilizers, and amine-based stabilizers can be added to a hydrogenated product of the copolymer.
(Method for Producing Modified Hydrogenated Block Copolymer)

The resin composition of the present embodiment contains the component (I): the modified block copolymer, and the component (II): the resin having a polar group as described above.

The component (I) is preferably a modified hydrogenated block copolymer produced by the following production method.

Specifically, a method for producing the modified hydrogenated block copolymer includes:

a step of producing a block copolymer that has a polymer block (A) mainly comprising a vinyl aromatic compound unit, and a polymer block (B) mainly comprising a conjugated diene compound unit, and satisfies the following conditions (i), and (ii);

a step of obtaining a hydrogenated block copolymer by hydrogenating the block copolymer in such a manner as to satisfy the following conditions (iii) and (iv); and a modification step of performing a modification reaction of the hydrogenated block copolymer under melt kneading in such a manner as to achieve a content of a polar group of 0.01 to 5% by mass.
<Condition (i)>

A content of the vinyl aromatic compound unit in the modified block copolymer (I) is 1 to 30% by mass.
<Condition (ii)>

The polymer block (B) contains a 1,2-bond and/or 3,4-bond derived unit (a), and a 1,4-bond derived unit (b), and a content of the 1,2-bond and/or 3,4-bond derived unit (a) is 1 to 55% assuming that a total content of the polymer block (B) is 100%.
<Condition (iii)>

The polymer block (B) contains an alkenyl monomer unit (a1) resulting from hydrogenation of the 1,2-bond and/or 3,4-bond derived unit (a), and an alkenyl monomer unit (b1) resulting from hydrogenation of the 1,4-bond derived unit (b), and a total content of the alkenyl monomer unit (a1) and the alkenyl monomer unit (b1) is 5 to 55% assuming that the total content of the polymer block (B) is 100%.
<Condition (iv)>

An amount of the alkenyl monomer unit (a1) resulting from hydrogenation of the unit (a) is 80% or more assuming that an amount of the 1,2-bond and/or 3,4-bond derived unit (a) in the polymer block (B) is 100%.

In the method for producing the modified hydrogenated block copolymer, it is preferable that after the block copolymer is hydrogenated to obtain the hydrogenated block copolymer, the stabilizer is added, and then the modification step is performed.

Examples of the stabilizer include various phenol-based stabilizers, phosphorus-based stabilizers, sulfur-based stabilizers, and amine-based stabilizers.

Thus, a byproduct can be reduced.

In the modification step, a temperature of the hydrogenated block copolymer is controlled preferably to 150° C. to 260° C.

A more preferable upper limit is 250° C. or less. The lower limit is preferably 150° C. or more, and more preferably 160° C. or more.

A conjugated double bond is known as a general coloring mechanism. Therefore, when a modifier containing a double bond is used, and the polar group is added in the modification process in the melt kneading method, from the viewpoint for preventing a residual double bond in the hydrogenated block copolymer from being thermally decomposed to become a conjugated double bond for coloring, the temperature of the hydrogenated block copolymer is preferably 150 to 260° C. or less, and more preferably 160 to 250° C. or less.

The modified block copolymer (the component (I)) constituting the resin composition of the present embodiment is excellent in toughness at normal temperature and under ultralow temperature conditions, and hence the resin composition of the present embodiment tends to be also excellent in toughness.

The toughness of the component (I) can be obtained in accordance with JIS K 6251, and elongation at break at a tensile speed of 500 mm/min at ordinary temperature is preferably 500% or more, more preferably 550% or more, and further preferably 600% or more. Elongation at break at a tensile speed of 5 mm/min at −60° C. is preferably 100% or more, more preferably 150% or more, further preferably 200% or more, still more preferably 250% or more, and still further preferably 300% or more.

(Component (II): Resin (II) Having Polar Group)

The resin composition of the present embodiment contains the resin (II) having a polar group (hereinafter also referred to as the component (II)).

The component (II) is different from the component (I), that is, the modified block copolymer (I) having the "polar group."

Since the component (II) has a polar group, dispersibility with the component (I) described above is improved, and excellent shock resistance and toughness are exhibited under ultralow temperature conditions.

Here, examples of the "polar group" of the component (II) include, but are not limited to, an atomic group containing at least one functional group selected from the group consisting of a hydroxy group, a carboxyl group, a carbonyl group, a thiocarbonyl group, an acid halide group, an acid anhydride group, a carboxylic acid group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a silicon halide group, a silanol group, an alkoxy group, an alkoxide group, an alkoxy silicon group, a tin halide group, a boronic acid group, a boron-containing group, a boronate group, an alkoxy tin group, a phenyl tin group, a phenol group, and a thiol group.

Besides, the component (II) has preferably "affinity" or "reactivity", and more preferably "reactivity" with the polar group bonded to the component (I).

Here, the term "reactivity" means that the polar groups of the component (I) and the component (II) have covalent binding properties.

When polar groups are reacted with each other, for example, if OH of a carboxyl group is desorbed, or an amino group is desorbed through addition of hydrogen, the original polar groups may be changed or lost, and a case where a covalent bond is thus formed is encompassed in definition that the polar groups have "reactivity."

Besides, the term "affinity" means that the polar groups of the component (I) and the component (II) are easily collected or joined even though a covalent bond is not formed, and examples include an ionic bond, and a hydrogen bond.

Examples of a combination of the "polar groups" include:

a combination of an amino group with a carboxylic acid group, a carbonyl group, an epoxy group, a hydroxy group, an acid anhydride group, a sulfonic acid group, or an aldehyde group;

a combination of an isocyanate group with a hydroxyl group or a carboxylic acid;

a combination of an acid anhydride group with a hydroxy group;

a combination of a silanol group with a hydroxy group or a carboxylic acid group;

a combination of an epoxy group with a carboxylic acid group;

a combination of a halogen with a carboxylic acid group, a carboxylic acid ester group, an amino group, a phenol group, or a thiol group; and a combination of an alkoxy group with a hydroxy group, an alkoxide group, or an amino group.

It can be arbitrarily selected which of the polar groups of the component (I) and the component (II) forms a bond of these "polar groups".

Here, examples of the component (II) which is a resin having a "polar group" include an acrylonitrile-butadiene-styrene copolymer resin (ABS); a methacrylic acid ester-butadiene-styrene copolymer resin (MBS); a polyvinyl acetate-based resin, and a hydrolysate thereof; an acrylic acid, and a polymer of an ester or amide thereof; a polyacetal-based resin; a polyacrylate-based resin; and a nitrile resin that is a copolymer of a polymer of acrylonitrile and/or methacrylonitrile, and another copolymerizable monomer containing 50% by weight or more of such an acrylonitrile-based monomer.

Another example of the component (II) includes a polyamide resin.

Examples of the polyamide resin include polyamide-based resins (including copolymers thereof) such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (nylon 1012), polyundecanamide (nylon 11), polydodecanamide (nylon 12), a polycaproamide/polyhexamethylene adipamide copolymer (nylon 6/66) (wherein/indicates a copolymer, which also applies to the following), a polycaproamide/polyhexamethylene terephthalamide copolymer (nylon 6/6T), a polyhexamethylene adipamide/polyhexamethylene terephthalamide copolymer (nylon 66/6T), a polyhexamethylene adipamide/polyhexamethylene isophthalamide copolymer (nylon 66/6I), a polyhexamethylene adipamide/polyhexamethylene isophthalamide/polycaproamide copolymer (nylon 66/6I/6), a polyhexamethylene terephthalamide/polyhexamethylene isophthalamide copolymer (nylon 6T/6I), a polyhexamethylene terephthalamide/polyundecanamide copolymer (nylon 6T/11), a polyhexamethylene terephthalamide/polydodecanamide copolymer (nylon 6T/12), a polyhexamethylene adipamide/polyhexamethylene terephthalamide/polyhexamethylene isophthalamide copolymer (nylon 66/6T/6I), polyxylylene adipamide (nylon XD6), polyxylylene sebacamide (nylon XD10), a polyhexamethylene terephthalamide/polypentamethylene terephthalamide copolymer (nylon 6T/5T), a polyhexamethylene terephthalamide/poly-2-methylpentamethylene terephthalamide copolymer (nylon 6T/M5T), a polypentamethylene terephthalamide/polydecamethylene terephthalamide copolymer (nylon 5T/10T), polynonamethylene terephthalamide (nylon 9T), polydecamethylene terephthalamide (nylon 10T), a polydecamethylene terephthalamide/polyhexamethylene dodecanamide copolymer (nylon 10T/612), a polydecamethylene terephthalamide/polyhexamethylene adipamide copolymer (nylon 10T/66), and polydodecamethylene terephthalamide (nylon 12T).

Other examples of the component (II) include polycarbonate-based polymers such as polyester-based resins, polyurethane-based resins, and poly-4,4'-dioxydiphenyl-2,2'-propane carbonate; thermoplastic polysulfone such as polyether sulfone and polyallyl sulfone; polyoxymethylene-based resins; polyphenylene ether-based resins such as poly(2,6-dimethyl-1,4-phenylene)ether; polyphenylene sulfide-based resins such as polyphenylene sulfide, and poly-4,4'-diphenylene sulfide; epoxy-based resins; polysulfone resins; phenol resins; polyarylate-based resins; polyether ketone polymers or copolymers; polyketone-based resins; fluorine-based resins; polyethylene terephthalate resins; and polyoxybenzoyl-based polymers, and polyimide-based resins.

From the viewpoint of high rigidity, the component (II) is preferably a polyamide-based resin, an acrylic-based resin, a polyacetal resin, a polycarbonate resin, a polyethylene terephthalate resin, a polybutylene terephthalate resin, a polyphenylene sulfide resin, a polysulfone resin, an epoxy resin, or a phenol resin, and is more preferably a polyamide-based resin, an epoxy resin, or a polyester-based resin, and from the viewpoint of processability, is further preferably a polyamide-based resin, and from the viewpoint that it can be processed at a low temperature, is still more preferably polycaproamide (nylon 6).

Besides, when a polyamide-based resin is used as the component (II), from the viewpoint of the compatibility with the component (I), an amount ratio between an amine end and a carboxylic acid end at the end of the polyamide-based resin is, in terms of amine end/carboxylic acid end, preferably 10/90 to 60/40, and more preferably 20/80 to 55/45.

One of these components (II) may be singly used, or two or more of these may be used in combination.

A number average molecular weight of the component (II) is usually 1000 or more, preferably 5000 or more, and more preferably $1 \times 10^4$ or more from the viewpoints of processability and strength. The upper limit is preferably $500 \times 10^4$ or less, and more preferably $100 \times 10^4$ or less.

In the resin composition of the present embodiment, the mass ratio between the component (I) and the component (II) is, in terms of (I)/(II), 1/99 to 70/30.

When the mass ratio between the component (I) and the component (II) is in the above-described numerical range, a resin composition having high strength and sufficiently exhibiting shock resistance and toughness under ultralow temperature conditions can be obtained.

The lower limit of the mass ratio of the component (I)/the component (II) is preferably 5/95, more preferably 10/90, further preferably 15/85, and still more preferably 20/80. The upper limit is preferably 65/35, and more preferably 40/60.

(Component (III))

The resin composition of the present embodiment may further contain, as a component (III), a filler, a flame retardant, or another additive.

The component (III) is not especially limited as long as it is a substance generally used to be compounded in a resin composition.

Examples of the component (III) used as the filler include, but are not limited to, inorganic fillers such as silica, calcium carbonate, magnesium carbonate, magnesium hydroxide, aluminum hydroxide, calcium sulfate, barium sulfate, carbon black, glass fiber, glass beads, a glass balloon, a glass flake, graphite, titanium oxide, potassium titanate whisker, carbon fiber, alumina, kaolin clay, silicic acid, calcium silicate, quarts, mica, talc, clay, zirconia, potassium titanate, alumina, and metal particles; and organic fillers such as wood chips, a wood powder, pulp, and cellulose nanofiber.

One of these can be singly used, or a plurality of these can be used in combination.

The shape of these fillers is not especially limited, but may be in any shape such as a flaky shape, a spherical shape, a granular shape, a powder shape, or an amorphous shape.

Examples of the flame retardant include a halogen-based flame retardant such as a bromine compound, a phosphorus-based flame retardant such as an aromatic compound, and an inorganic flame retardant of mainly a metal hydroxide. From the viewpoint of reducing environmental load, an inorganic flame retardant is preferably used.

Examples of the inorganic flame retardant include metal hydroxides such as magnesium hydroxide, aluminum hydroxide, and calcium hydroxide; metal oxides such as zinc borate and barium borate; calcium carbonate; clay; basic magnesium carbonate; and hydrated metal compounds such as hydrotalcite. In the present embodiment, from the viewpoint of improving flame retardancy, a metal hydroxide such as magnesium hydroxide is preferably used among the above-described flame retardants. The above-described flame retardants include what is called a flame retardant aid, which has a low effect of exhibiting flame retardancy by itself, but exhibits an excellent effect synergistically when used together with another flame retardant.

The filler and the flame retardant may be of a type precedently surface treated with a surface treatment agent such as silane coupling agent.

Another additive is not especially limited as long as it is generally used to be compounded in a thermoplastic resin. Examples of such another additive include, but are not limited to, pigments and/or colorants such as carbon black, and titanium oxide; lubricants such as stearic acid, behenic acid, zinc stearate, calcium stearate, magnesium stearate, and ethylene bisstearamide; release agents; plasticizers such as organic polysiloxane, phthalic acid ester-based or adipic acid ester compounds, fatty acid ester-based compounds such as an azelaic acid ester compound, and plasticizers such as mineral oil; antioxidants such as hindered phenol-based or phosphorus-based heat stabilizers; various stabilizers such as a hindered amine-based light stabilizer; benzotriazole-based UV absorbing agents; antistatic agents; reinforc-
ing agents such as organic fiber, glass fiber, carbon fiber, and
metal whisker; and other additives, and mixtures of any of
these.

The resin composition of the present embodiment pref-
erably contains, as the component (III), at least one or more
stabilizers in particular.

The "resin (II) having a polar group" constituting the resin
composition of the present embodiment has a polar group,
and hence its melting temperature is high from the viewpoint
of entropy and enthalpy.

Besides, a polar group is bonded to the component (I) as
described above, and when the "polar group" is bonded by
the melt kneading method, it is melted at a high temperature,
and subjected to shear. Accordingly, a side reaction such as
cross-linkage is caused when the component is exposed to
the high temperature, and rigidity increase or increase of the
tan δ peak temperature occurs, and hence shock resistance
and toughness may not be sufficiently exhibited under
ultralow temperature conditions.

In other words, the tan δ peak temperature tends to be
shifted to a high temperature side due to occurrence of a side
reaction such as cross-linkage at the time of modification,
and therefore, when the resin composition of the present
embodiment contains a stabilizer as the component (III), the
increase of the tan δ peak temperature can be suppressed.

The amount of the stabilizer to be added is, with respect
to the component (I), preferably 0.001% by mass or more,
more preferably 0.005% by mass or more, and further
preferably 0.01% by mass or more.

As the type of the stabilizer, from the viewpoint of
suppressing the side reaction such as cross-linkage described
above, phenol-based and amine-based stabilizers reacting
with a carbon radical generated through thermal decompo-
sition and/or a peroxy radical generated through oxidation of
the modified block copolymer (I), and phosphorus-based
and sulfur-based stabilizers reacting with hydroxy peroxide
are preferred, a compound further containing an aromatic
ring is more preferred from the viewpoint of improving
reactivity with a peroxy radical and/or hydroxy peroxide,
and phenol-based, amine-based and phosphorus-based sta-
bilizers containing an aromatic ring is further preferred.

As the stabilizer, any of conventionally known stabilizers
can be used, and examples of phenol-based stabilizers
include, but are not limited to, octadecyl-3-(3,5-di-t-butyl-
4-hydroxyphenyl)propionate, 2-tert-butyl-6-(3-tert-butyl-2-
hydroxy-5-methylbenzyl)-4-methylphenyl acrylate, 1'-hy-
droxy[2,2'-ethylidenebis[4,6-bis(1,1-dimethylpropyl)
benzen]]-1-yl       acrylate,       tris(3,5-di-tert-butyl-4-
hydroxybenzyl)      isocyanurate,      1,1,3-tris(2-methyl-4-
hydroxy-5-tert-butylphenyl)butane,      4,4'-butylidenebis(6-
tert-butyl-m-cresol),     pentaerythritoltetrakis[3-(3,5-di-tert-
butyl-4-hydroxyphenyl)propionate], 2,2'-dimethyl-2,2'-(2,4,
8,10-tetraoxaspiro[5.5]undecane-3,9-diyl)dipropane-1,1'-
diyl        bis[3-(3-tert-butyl-4-hydroxy-5-methylphenyl)
propanoate], 2,4,6-tris(3',5'-di-tert-butyl-4'-hydroxybenzyl)
mesitylene,        2,2'-thiodiethylbis[3-(3,5-di-tert-butyl-4-
hydroxyphenyl)propionate], N,N'-hexamethylenebis[3-(3,5-
di-tert-butyl-4-hydroxyphenyl)propanamide], octyl 3-(3,5-
di-tert-butyl-4-hydroxyphenyl)propanoate,     bis[3-(3-tert-
butyl-4-hydroxy-5-methylphenyl)propionic          acid]
[ethylenebis(oxyethylene)], and 1,6-hexanediolbis[3-(3,5-
di-tert-butyl hydroxyphenyl)propionate].

Examples of amine-based stabilizers include 4-[[4,6-bis
(octylthio)-1,3,5-triazin-2-yl]amino]-2,6-di-tert-butylphe-
nol, N,N"-diphenyl-1,4-phenylenediamine, N-phenyl-1-
naphthylamine,       4,4'-bis(α,α-dimethylbenzyl)diphenylamine,    4-isopropylaminodiphenylamine,    N-(1,3-dimethyl-
butyl)-N'-phenyl-1,4-phenylenediamine,        N—N'-di-sec-
butyl-1,4-phenylenediamine,  and  6-ethoxy-2,2,4-trimethyl-
1,2-dihydroxyquinoline.

Examples of phosphorus-based stabilizers include tris(2,
4-di-tert-butylphenyl) phosphite, tri-p-tolyl phosphite, tri-
hexyl phosphite, tributyl phosphite, tri-o-tolyl phosphite,
tris(2-ethylhexyl) phosphite, trioctyl phosphite, and triiso-
decyl phosphite.

Examples of sulfur-based stabilizers include didodecyl
3,3'-thiodipropionate, 3,3'-thiodipropionic acid, and 2-mer-
captobenzimidazole.

One of these stabilizers may be singly used, or two or
more of these may be used together, and from the viewpoint
that the above-described b value, measured with a color-
difference meter, of the sheet with a thickness of 2 mm
obtained by compression molding the component (I) is
controlled to 30 or less, a phenol-based stabilizer and a
phosphorus-based or sulfur-based stabilizer are preferably
used together.

Timing of adding the stabilizer to the resin composition of
the present embodiment is not especially limited, and since
the stabilizer is expected to exhibit a function to suppress the
generation of a coloring component in the modification
process by melt kneading, it is preferable that a stabilizer
having an antioxidant function is added before the melt
kneading process.

Specifically, the timing can be a stage previous to a
process for separating a copolymer from the solution after
the polymerization reaction and the hydrogenation reaction
of the component (I), and/or a stage previous to the modi-
fication process for imparting the polar group to the polymer
in the melt kneading method described above, and/or a stage
previous to the process for mixing the component (I) and the
component (II).

(Component (V))

The resin composition of the present embodiment may
further contain, as a component (V), 100 parts by mass or
less, with respect to 100 parts by mass of the component (I)
in the resin composition of the present embodiment, of a
block copolymer (V) that has a polymer block (A') mainly
comprising a vinyl aromatic compound unit and a polymer
block (B') mainly comprising a conjugated diene compound
unit, has no polar group bonded thereto, and satisfies the
following conditions (vii) to (ix) unless toughness and shock
resistance under ultralow temperature conditions are
impaired.

When the viscosity of the resin composition is preferably
reduced from the viewpoint of obtaining a molded article
having a large size from the resin composition of the present
embodiment, reactivity between the component (II) and the
component (I) is preferably reduced. Accordingly, the com-
ponent (V) preferably has no polar group bonded thereto.

Besides, from the viewpoint that shock resistance and
toughness under ultralow temperature conditions are not
impaired, it is preferable that the following conditions (vii)
to (ix) are satisfied.

<Condition (vii)>

A content of the vinyl aromatic compound unit in the
block copolymer (V) is 1 to 30% by mass.

<Condition (viii)>

The polymer block (B') of the block copolymer (V)
contains a 1,2-bond and/or 3,4-bond derived unit (a'), and a
1,4-bond derived unit (b'), and a content of the 1,2-bond
and/or 3,4-bond derived unit (a') is 1 to 55% assuming that
a total content of the polymer block (B') is 100%.

<Condition (ix)>

The polymer block (B') contains an alkenyl monomer unit (a'1) resulting from hydrogenation of the 1,2-bond and/or 3,4-bond derived unit (a'), and an alkenyl monomer unit (b'1) resulting from hydrogenation of the 1,4-bond derived unit (b'), and a total content of the alkenyl monomer unit (a'1) and the alkenyl monomer unit (b'1) is 5 to 55% assuming that the total content of the polymer block (B') is 100%.

Besides, the block copolymer (V) more preferably satisfies the following condition (x):

<Condition (x)>

Assuming that the amount of the 1,2-bond and/or 3,4-bond derived unit (a') in the polymer block (B') is 100%, an amount of the alkenyl monomer unit (a'1) resulting from hydrogenation of the 1,2-bond and/or 3,4-bond derived unit (a') is 80% or more.

When the viscosity of the resin composition of the present embodiment is to be reduced, it is preferable to reduce the reactivity between the polar group of the component (II) and the component (I) as described above.

From a similar viewpoint, when the resin composition of the present embodiment further contains the component (V), it is preferable that no polar group is bonded to the component (V). From the viewpoint that shock resistance and toughness under ultralow temperature conditions are not impaired, the component (V) preferably satisfies the above-described conditions (vii) to (ix) similarly to the component (I), and more preferably satisfies the condition (x).

When the conditions (vii) to (x) are satisfied, the component (I) and the component (V) are in a rubber state with low rigidity under ultralow temperature conditions, and therefore, the resin composition of the present embodiment tends to be excellent in shock resistance and toughness under ultralow temperature conditions.

An amount of the component (V) to be added is, with respect to 100 parts by mass of the component (I) in the resin composition of the present embodiment, preferably 100 parts by mass or less, more preferably 80 parts by mass or less, further preferably 70 parts by mass or less, and still more preferably 60 parts by mass or less.

[Method for Producing Resin Composition]

A method for producing the resin composition of the present embodiment is not especially limited, and any of known methods can be utilized.

An example of the method for producing the resin composition of the present embodiment includes a method for producing a resin composition using a known kneading device capable of homogenously mixing resin components.

The kneading device is not especially limited, and any device can be used. Examples of the kneading device include a single screw extruder, a twin screw extruder, a kneader, a Banbury mixer, and a roll.

A melt kneading temperature is preferably 100 to 400° C., and more preferably 150 to 350° C.

For example, dry blending can be performed with various mixers, and a melt kneading method using a general mixer such as a Banbury mixer, a single screw extruder, a twin screw extruder, a kneader, a multi-screw extruder, or a roll, a method in which respective components are dissolved or dispersed and mixed, and then a solvent is removed by heating, or the like is employed.

In the production of the resin composition of the present embodiment, a melt kneading method using an extruder is preferred from the viewpoints of productivity and good kneadability.

A shape of the resin composition to be obtained is not especially limited, and examples include a pellet shape, a sheet shape, a strand shape, and a chip shape. Besides, after the melt kneading, a molded article can be directly obtained.

[Molded Article]

A molded article of the present embodiment is a molded article of the above-described resin composition of the present embodiment, and when the resin composition of the present embodiment is processed and/or molded, a variety of molded articles, such as an injection molded article, a blow molded article, a pressure molded article, a vacuum molded article, an extruded article, and a press molded article, in any shape of a sheet, a film, various containers, a cylindrical container, a housing, and a tube to be used under ultralow temperature conditions can be obtained.

(Preferable Aspect of Molded Article)

The molded article of the present embodiment is particularly a molded article of a resin composition containing:

at least one resin selected from the group consisting of a polyamide-based resin, an acrylic-based resin, a polyacetal resin, a polycarbonate resin, a polyethylene terephthalate resin, a polybutylene terephthalate resin, a polyphenylene sulfide resin, a polysulfone resin, an epoxy resin, and a phenol resin; and a block copolymer having a polymer block (A) mainly comprising a vinyl aromatic compound unit, and a polymer block (B) mainly comprising a conjugated diene compound unit, wherein the block copolymer is a modified block copolymer that has a content of the vinyl aromatic compound unit of 1 to 30% by mass, has a vinyl bond content in the polymer block (B) mainly comprising a conjugated diene compound unit of 1 to 55%, and has at least one selected from the group consisting of an acid anhydride group, a carboxylic acid group, and a hydroxyl group, and the molded article is preferably a molded article satisfying the following conditions (I-1) and (II-1) from the viewpoint that excellent shock resistance and toughness can be obtained in application to be used under ultralow temperature conditions.

<Condition (I-1)>

A strip specimen having a width of 10 mm, a length of 170 mm, and a thickness of 2 mm obtained from the molded article has a tensile elongation at break under a condition of −50° C. at a tensile speed of 5 mm/min, of 15% or more.

<Condition (II-1)>

A strip specimen having a width of 10 mm, a length of 40 mm, and a thickness of 2 mm obtained from the molded article has a peak at −60° C. or less in viscoelasticity measurement at a strain of 0.1% and a frequency of 1 Hz.

In the molded article, a hydrogenation rate of the conjugated diene compound unit in the modified block copolymer is preferably 5 to 55%. When the hydrogenation rate is 55% or less, a primary dispersion peak temperature of a tan δ curve of the modified block copolymer can be controlled to −55° C. or less.

When the hydrogenation rate is 5% or more, excellent heat stability can be obtained. The hydrogenation rate is more preferably 5 to 50%, further preferably 10 to 45%, and still more preferably 15 to 40%.

The hydrogenation rate can be controlled to fall in the above-described numerical range by appropriately adjusting a reaction temperature, a reaction time, a supply amount of hydrogen, an amount of a catalyst, and the like in a hydrogenation process.

A shape of the molded article is not especially limited, and the molded article can be processed into any of known shapes. For example, a dumbbell specimen or a strip specimen can be produced by cutting the specimen out from a portion close to a plane in the molded article. It is not necessary that the specimen is a plane, but it may be plane sufficiently for measurement of tensile elongation at break or viscoelasticity measurement. For example, in a cylindrical molded article, although depending on the diameter of the cylinder, a specimen usable for measurement can be easily produced by cutting the specimen in the lengthwise direction. Besides, the thickness of the molded article may be larger than 2 mm, and in this case, when a specimen obtained by scraping, with a file or the like, a portion with a thickness of 2 mm or more to be plane as far as possible and to have a thickness of 2 mm is used, elongation at break and viscoelasticity can be measured.

The molded article has a Charpy impact value, measured by performing Charpy impact test on a notch-shaped strip specimen having a width of 10 mm, a length of 80 mm, and a thickness of 2 mm, and obtained from the molded article in accordance with JIS K 7111-1 under a condition of $-50°$ C. with an impact direction edgewise, of preferably 10 kJ/m$^2$ or more. Thus, excellent shock resistance can be obtained under ultralow temperature conditions.

In the molded article of the present invention, the modified block copolymer is preferably in a state of being dispersed in a polar resin such as polyamide from the viewpoint of obtaining excellent properties under ultralow temperature conditions, and in the dispersed state of the modified block copolymer in the resin, an average dispersion particle size of the modified block copolymer is preferably 5 μm or less, more preferably 4 μm or less, and further preferably 3 μm or less.

The average particle size of the modified block copolymer dispersed in the molded article can be calculated based on a backscattered electron image obtained through observation with a scanning electron microscope of a cross-section of the molded article cut with a cryo-microtome. Specifically, image analysis software (imageJ) is used to perform image thresholding on a sea-island structure of the obtained backscattered electron image, and equivalent circle diameters of 500 or more island phases in an image resulting from the image thresholding are calculated.

The resin composition constituting the molded article may contain, with respect to 100 parts by mass of the resin composition, 1 to 50 parts by mass of an additive such as a filler for purposes of strength improvement, and more preferably contains about 5 to 30 parts by mass of the filler. In order to impart functions of flame retardancy, tracking resistance and the like in addition to toughness and shock resistance under ultralow temperature conditions, another additive such as a flame retardant may be contained in an amount of 1 to 70 parts by mass with respect to 100 parts by mass of the resin composition, and when such an additive is contained, it is preferable that the tensile elongation at break measured under the above-described conditions is 10% or more, and that shock resistance is 10 kJ/m$^2$ or more.

The molded article can be formed into an arbitrary shape in accordance with use application. Examples include, but are not limited to, various containers, a cylindrical container, and a housing.

In particular, when strength is required in the use application, the resin to be combined with the modified copolymer is preferably a polyamide-based resin, a polyphenylene sulfide resin, a polysulfone resin, or an epoxy resin, when an appearance is required, a polyamide-based resin, an acrylic-based resin, a polyacetal resin, a polycarbonate resin, a polyethylene terephthalate resin, or a polybutylene terephthalate resin is preferred, when airtightness is particularly required, a polyamide-based resin, an acrylic-based resin, an epoxy resin, or a phenol resin is preferred, when strength and processability are required in addition to the airtightness, a polyamide-based resin is preferred, and from the viewpoint of cost, polyhexamethylene adipamide (nylon 66) or polycaproamide (nylon 6) is particularly preferred.

EXAMPLES

Now, the present embodiment will be specifically described with reference to specific examples and comparative examples, and it is noted that the present embodiment is not limited by the following examples and comparative examples at all.

It is noted that the structural identification and measurement of physical properties of each modified block copolymer (component (I)) used in the following examples and comparative examples were performed as follows.

[Methods for Structural Identification and Measurement of Physical Properties of Polymer]

((1) Content of Vinyl Aromatic Compound Unit in Block Copolymer)

Measurement was performed by using a block copolymer before modification and before hydrogenation with an ultraviolet spectrophotometer (UV-2450, manufactured by Shimadzu Corporation). A measured value was defined as a content of the vinyl aromatic compound unit in a modified block copolymer (I).

((2) Vinyl Bond Content of Block Copolymer)

Measurement was performed by using a block copolymer before modification and before hydrogenation with an infrared spectrophotometer (FT/IR-230, manufactured by JASCO Corporation). A vinyl bond content in the block copolymer was calculated by the Hampton method. This value was defined as a content of the 1,2-bond and/or 3,4-bond derived unit (a) assuming that the content of the polymer block (B) in the modified block copolymer (I) was 100%.

((3) Molecular Weight and Molecular Weight Distribution of Block Copolymer)

A molecular weight of a block copolymer before modification and before hydrogenation was measured by GPC [apparatus: LC-10 (manufactured by Shimadzu Corporation), column: TSKgel GMHXL (4.6 mm×30 cm)].

Tetrahydrofuran was used as a solvent. The measurement was performed under a condition of a temperature of 35° C.

The molecular weight herein is a weight average molecular weight obtained using a calibration curve (created using a peak molecular weight of standard polystyrene) obtained by measurement of commercially available standard polystyrene.

It is noted that when a plurality of peaks were present in a chromatogram, the molecular weight was obtained as an average molecular weight obtained based on a molecular weight of each peak and a composition ratio of each peak (obtained based on an area ratio of the peak in the chromatogram). A molecular weight distribution refers to a ratio (Mw/Mn) between the weight average molecular weight (Mw) thus obtained and a number average molecular weight (Mn).

((4) Hydrogenation Rate of Double Bond of Conjugated Diene Monomer Unit of Block Copolymer (Vinyl Hydrogenation Rate))

A modified block copolymer after hydrogenation was used to measure a hydrogenation rate of a double bond of the conjugated diene monomer unit with a nuclear magnetic resonance apparatus (DPX-400, manufactured by BRUKER).

((5) tan δ Peak Temperature)

First, a block copolymer before modification and before hydrogenation, and a modified block copolymer after the modification and after the hydrogenation were used as samples, and each of these samples was cut into a sheet-shaped molded article having a size of a width of 10 mm and a length of 40 mm to be used as a measurement sample.

Next, the measurement sample was set in twisted geometry in an apparatus, ARES (trade name, manufactured by TA Instruments Japan Inc.) to perform viscoelasticity measurement under conditions of an effective measurement length of 25 mm, a strain of 0.3%, a frequency of 1 Hz, and a temperature increase rate of 3° C./min.

A tan δ peak temperature was defined as a value obtained based on a peak detected by automatic measurement with RSI Orchestrator (trade name, manufactured by TA Instruments Japan Inc.).

((6) Measurement of Amount of Residual Metal)

Amounts of Ti and Li, which were presumed to remain from a used polymerization initiator and a catalyst species used in the hydrogenation reaction, were measured, as an amount of metals in the block copolymer, by performing elemental analysis by inductively coupled plasma (ICP) (ICPS-7510, Shimadzu Corporation).

A total amount of the metals of 120 ppm or less was regarded as a preferable amount of metals.

((6) Measurement of b Value)

A modified block copolymer (I) described below was compression molded to produce a sheet with a thickness of 2 mm, which was used as a measurement sample.

A b value of the sheet was measured with a color-difference meter (ZE-2000, manufactured by Nippon Denshoku Industries Co., Ltd.).

((7) Measurement of Resin Temperature)

A temperature of the modified block copolymer (I) described below was measured with a temperature sensor (T-270Z, manufactured by RKC INSTRUMENT INC.) inserted in an extruder die portion.

((8) Measurement of Amount of Cross-Linked Component)

5 g of the modified block copolymer (I) described below was dissolved in 200 mL of toluene, and the resultant was suction filtered through filter paper (thickness: 0.2 mm, maximum diameter: 6 μm, filtering efficiency: 65%), whose mass had been measured. The mass was measured after sufficiently drying the resultant filter paper, and an amount of a cross-linked component was calculated by subtracting the mass of the filter paper before the filtration.

[Preparation of Hydrogenation Catalyst]

A hydrogenation catalyst to be used for producing a hydrogenated block copolymer in each of examples and comparative examples described below was prepared by the following method.

A reactor equipped with a stirrer, which had been precedently subjected to nitrogen replacement, was charged with 1 liter of dried and purified cyclohexane.

Next, 100 mmol of bis(η5-cyclopentadienyl)titaniumdichloride was added thereto. To the resultant, a n-hexane solution containing 200 mmol of trimethylaluminum was added with sufficient stirring, followed by a reaction at room temperature for about 3 days. Thus, the hydrogenation catalyst was obtained.

[Hydrogenated Product of Block Copolymer]

Hydrogenated products (1) to (28) of block copolymers each of a vinyl aromatic compound and conjugated diene were prepared as follows.

The structure, the content of the vinyl aromatic compound unit, the vinyl bond content, the hydrogenation rate, the vinyl hydrogenation rate, the amount of heavy metals, and the tan δ peak temperature obtained based on a viscoelasticity spectrum of each of the thus obtained hydrogenated block copolymer blocks are shown in Tables 1 to 3 below.

[Amount of Stabilizer Added]

It was determined that an amount of a stabilizer to be added was preferably 6 parts by mass or less, more preferably 5 parts by mass or less, further preferably 4 parts by mass or less, and still more preferably 3 parts by mass or less with respect to 100 parts by mass of the hydrogenated block copolymer (I).

(Hydrogenated Block Copolymer (1))

Batch polymerization was performed with a tank reactor (internal capacity: 10 L) equipped with a stirrer and a jacket.

First, a cyclohexane solution containing 7.5 parts by mass of styrene (concentration: 20% by mass) was charged.

Next, 0.11 parts by mass of n-butyllithium with respect to 100 parts by mass of all monomers, and 0.2 mol, per mol of n-butyllithium, of tetramethylethylenediamine (TMEDA) were added thereto, followed by polymerization at 70° C. for 20 minutes.

Next, a cyclohexane solution containing 85 parts by mass of butadiene (concentration: 20% by mass) was added thereto, followed by polymerization at 70° C. for 45 minutes.

Then, a cyclohexane solution containing 7.5 parts by mass of styrene (concentration: 20% by mass) was charged. Thereafter, methanol was added thereto to stop the polymerization reaction to obtain a block copolymer.

The block copolymer obtained as described above had a styrene content of 15% by mass, a weight average molecular weight of $10.8 \times 10^4$, a molecular weight distribution of 1.10, and a content of the 1,2-bond and/or 3,4-bond derived unit (a) (vinyl bond content (%): unit (a)/block (B)) of 22%.

To the thus obtained block copolymer, the hydrogenation catalyst prepared as described above was added in an amount, in terms of Ti, of 100 ppm per 100 parts by mass of the block copolymer, followed by a hydrogenation reaction at a hydrogen pressure of 0.7 MPa at a temperature of 80° C. for about 0.5 hours.

Next, octadecyl-3-(3,5-di-t-butyl-4-hydroxyphenyl)propionate was added as a stabilizer in an amount of 0.3 parts by mass with respect to 100 parts by mass of a hydrogenated block copolymer, and thus, a hydrogenated block copolymer (I) was obtained.

In the thus obtained hydrogenated block copolymer (1), assuming that the total content of the polymer block (B) is 100%, a total amount ratio of the alkenyl monomer unit (a1) resulting from hydrogenation of the unit (a) and the alkenyl monomer unit (b1) resulting from hydrogenation of the unit (b) (hydrogenation rate: (a1)+(b1)/(B)) was 32%, and a ratio of the unit (a1) to the unit (a) (vinyl hydrogenation rate: (a1)/(a)) was 95%.

(Hydrogenated Block Copolymer (2))

The polymerization reaction and the hydrogenation reaction were performed through the same procedures as those for the above-described hydrogenated block copolymer (I) except that TMEDA was added in an amount of 0.4 mol per mol of n-butyllithium, and that the hydrogenation reaction time was 0.75 hours.

A hydrogenated block copolymer (2) thus obtained had a styrene content of 15% by mass, a weight average molecular weight of $10.0\times10^4$, a molecular weight distribution of 1.10, a vinyl bond content of 45%, a hydrogenation rate of 40%, and a vinyl hydrogenation rate of 83%.

(Hydrogenated Block Copolymer (3))

The polymerization reaction and the hydrogenation reaction were performed through the same procedures as those for the above-described hydrogenated block copolymer (I) except that the hydrogenation reaction time was 1.25 hours.

A hydrogenated block copolymer (3) thus obtained had a styrene content of 15% by mass, a weight average molecular weight of $10.4\times10^4$, a molecular weight distribution of 1.10, a vinyl bond content of 19%, a hydrogenation rate of 45%, and a vinyl hydrogenation rate of 99%.

(Hydrogenated Block Copolymer (4))

The polymerization reaction and the hydrogenation reaction were performed through the same procedures as those for the above-described hydrogenated block copolymer (I) except that TMEDA was added in an amount of 0.1 mol per mol of n-butyllithium.

A hydrogenated block copolymer (4) thus obtained had a styrene content of 15% by mass, a weight average molecular weight of $10.1\times10^4$, a molecular weight distribution of 1.10, a vinyl bond content of 12%, a hydrogenation rate of 34%, and a vinyl hydrogenation rate of 99%.

(Hydrogenated Block Copolymer (5))

The polymerization reaction and the hydrogenation reaction were performed through the same procedures as those for the above-described hydrogenated block copolymer (I) except that the hydrogenation reaction time was 0.25 hours.

A hydrogenated block copolymer (5) thus obtained had a styrene content of 15% by mass, a weight average molecular weight of $9.9\times10^4$, a molecular weight distribution of 1.10, a vinyl bond content of 24%, a hydrogenation rate of 26%, and a vinyl hydrogenation rate of 86%.

(Hydrogenated Block Copolymer (6))

Batch polymerization was performed with a tank reactor (internal capacity: 10 L) equipped with a stirrer and a jacket.

First, a cyclohexane solution containing 12.5 parts by mass of styrene (concentration: 20% by mass) was charged.

Next, 0.11 parts by mass of n-butyllithium with respect to 100 parts by mass of all monomers, and 0.2 mol, per mol of n-butyllithium, of tetramethylethylenediamine (TMEDA) were added thereto, followed by polymerization at 70° C. for 20 minutes.

Next, a cyclohexane solution containing 75 parts by mass of butadiene (concentration: 20% by mass) was added thereto, followed by polymerization at 70° C. for 45 minutes.

Then, a cyclohexane solution containing 12.5 parts by mass of styrene (concentration: 20% by mass) was charged. Thereafter, methanol was added thereto to stop the polymerization reaction.

A block copolymer obtained as described above had a styrene content of 25% by mass, a weight average molecular weight of $10.4\times10^4$, a molecular weight distribution of 1.10, and a vinyl bond content of 23%.

To the thus obtained block copolymer, the hydrogenation catalyst prepared as described above was added in an amount, in terms of Ti, of 100 ppm per 100 parts by mass of the block copolymer, followed by a hydrogenation reaction at a hydrogen pressure of 0.7 MPa at a temperature of 80° C. for about 0.5 hours.

Next, octadecyl-3-(3,5-di-t-butyl hydroxyphenyl)propionate was added as a stabilizer in an amount of 0.3 parts by mass with respect to 100 parts by mass of a block copolymer, and thus, a hydrogenated block copolymer (6) was obtained.

The hydrogenated block copolymer (6) thus obtained had a hydrogenation rate of 30%, and a vinyl hydrogenation rate of 89%.

(Hydrogenated Block Copolymer (7))

Batch polymerization was performed with a tank reactor (internal capacity: 10 L) equipped with a stirrer and a jacket.

First, a cyclohexane solution containing 5 parts by mass of styrene (concentration: 20% by mass) was charged.

Next, 0.11 parts by mass of n-butyllithium with respect to 100 parts by mass of all monomers, and 0.2 mol, per mol of n-butyllithium, of tetramethylethylenediamine (TMEDA) were added thereto, followed by polymerization at 70° C. for 20 minutes.

Next, a cyclohexane solution containing 90 parts by mass of butadiene (concentration: 20% by mass) was added thereto, followed by polymerization at 70° C. for 45 minutes.

Then, a cyclohexane solution containing 5 parts by mass of styrene (concentration: 20% by mass) was charged.

Thereafter, methanol was added thereto to stop the polymerization reaction.

A block copolymer obtained as described above had a styrene content of 10% by mass, a weight average molecular weight of $10.5\times10^4$, a molecular weight distribution of 1.10, and a vinyl bond content of 24%.

To the thus obtained block copolymer, the hydrogenation catalyst prepared as described above was added in an amount, in terms of Ti, of 100 ppm per 100 parts by mass of the block copolymer, followed by a hydrogenation reaction at a hydrogen pressure of 0.7 MPa at a temperature of 80° C. for about 0.5 hours.

Next, octadecyl-3-(3,5-di-t-butyl-4-hydroxyphenyl)propionate was added as a stabilizer in an amount of 0.3 parts by mass with respect to 100 parts by mass of a hydrogenated copolymer, and thus, a hydrogenated block copolymer (7) was obtained.

The hydrogenated block copolymer (7) thus obtained had a hydrogenation rate of 36%, and a vinyl hydrogenation rate of 95%.

(Hydrogenated Block Copolymer (8))

Batch polymerization was performed with a tank reactor (internal capacity: 10 L) equipped with a stirrer and a jacket.

First, a cyclohexane solution containing 5 parts by mass of butadiene (concentration: 20% by mass) was charged.

Next, 0.11 parts by mass of n-butyllithium with respect to 100 parts by mass of all monomers, and 0.2 mol, per mol of n-butyllithium, of tetramethylethylenediamine (TMEDA) were added thereto, followed by polymerization at 70° C. for 3 minutes.

Next, a cyclohexane solution containing 12.5 parts by mass of styrene (concentration: 20% by mass) was added thereto, followed by polymerization at 70° C. for 20 minutes.

Next, a cyclohexane solution containing 70 parts by mass of butadiene (concentration: 20% by mass) was added thereto, followed by polymerization at 70° C. for 40 minutes.

Then, a cyclohexane solution containing 12.5 parts by mass of styrene (concentration: 20% by mass) was charged. Thereafter, methanol was added thereto to stop the polymerization reaction.

A block copolymer obtained as described above had a styrene content of 25% by mass, a weight average molecular weight of $10.5\times10^4$, a molecular weight distribution of 1.10, and a vinyl bond content of 30%.

To the thus obtained block copolymer, the hydrogenation catalyst prepared as described above was added in an amount, in terms of Ti, of 100 ppm per 100 parts by mass of the block copolymer, followed by a hydrogenation reaction at a hydrogen pressure of 0.7 MPa at a temperature of 80° C. for about 0.5 hours, and thus, a hydrogenated block copolymer was obtained.

Next, octadecyl-3-(3,5-di-t-butyl hydroxyphenyl)propionate was added as a stabilizer in an amount of 0.3 parts by mass with respect to 100 parts by mass of the hydrogenated block copolymer, and thus, a hydrogenated block copolymer (8) was obtained.

The hydrogenated block copolymer (8) thus obtained had a hydrogenation rate of 40%, and a vinyl hydrogenation rate of 96%.

(Hydrogenated Block Copolymer (9))

Batch polymerization was performed with a tank reactor (internal capacity: 10 L) equipped with a stirrer and a jacket.

First, a cyclohexane solution containing 20 parts by mass of styrene (concentration: 20% by mass) was charged.

Next, 0.11 parts by mass of n-butyllithium with respect to 100 parts by mass of all monomers, and 0.2 mol, per mol of n-butyllithium, of tetramethylethylenediamine (TMEDA) were added thereto, followed by polymerization at 70° C. for 20 minutes.

Next, a cyclohexane solution containing 80 parts by mass of butadiene (concentration: 20% by mass) was added thereto, followed by polymerization at 70° C. for 45 minutes.

Next, ethyl benzoate was added thereto in an amount of 0.27% per mol of n-butyllithium, followed by a reaction at 70° C. for 20 minutes.

A block copolymer obtained as described above had a styrene content of 20% by mass, a weight average molecular weight of $10.4 \times 10^4$, a molecular weight distribution of 1.10, a coupling ratio of 49%, and a vinyl bond content of 18%.

To the thus obtained block copolymer, the hydrogenation catalyst prepared as described above was added in an amount, in terms of Ti, of 100 ppm per 100 parts by mass of the block copolymer, followed by a hydrogenation reaction at a hydrogen pressure of 0.7 MPa at a temperature of 80° C. for about 0.5 hours, and thus, a hydrogenated block copolymer was obtained.

Next, octadecyl-3-(3,5-di-t-butyl-4-hydroxyphenyl)propionate was added as a stabilizer in an amount of 0.3 parts by mass with respect to 100 parts by mass of the hydrogenated block copolymer, and thus, a hydrogenated block copolymer (9) was obtained.

The hydrogenated block copolymer (9) thus obtained had a hydrogenation rate of 25%, and a vinyl hydrogenation rate of 95%.

(Hydrogenated Block Copolymer (10))

The polymerization reaction and the hydrogenation reaction were performed through the same procedures as those for the above-described hydrogenated block copolymer (I) except that n-butyllithium was added in an amount of 0.16 parts by mass with respect to 100 parts by mass of all monomers.

A hydrogenated block copolymer (10) thus obtained had a styrene content of 15% by mass, a weight average molecular weight of $6.8 \times 10^4$, a molecular weight distribution of 1.10, a vinyl bond content of 24%, a hydrogenation rate of 33%, and a vinyl hydrogenation rate of 97%.

(Hydrogenated Block Copolymer (II))

The polymerization reaction and the hydrogenation reaction were performed through the same procedures as those for the above-described hydrogenated block copolymer (I)

except that n-butyllithium was added in an amount of 0.09 parts by mass with respect to 100 parts by mass of all monomers.

A hydrogenated block copolymer (II) thus obtained had a styrene content of 15% by mass, a weight average molecular weight of $12.5 \times 10^4$, a molecular weight distribution of 1.10, a vinyl bond content of 19%, a hydrogenation rate of 30%, and a vinyl hydrogenation rate of 98%.

(Hydrogenated Block Copolymer (12))

Batch polymerization was performed with a tank reactor (internal capacity: 10 L) equipped with a stirrer and a jacket.

First, a cyclohexane solution containing 17.5 parts by mass of styrene (concentration: 20% by mass) was charged.

Next, 0.11 parts by mass of n-butyllithium with respect to 100 parts by mass of all monomers, and 0.2 mol, per mol of n-butyllithium, of tetramethylethylenediamine (TMEDA) were added thereto, followed by polymerization at 70° C. for 20 minutes.

Next, a cyclohexane solution containing 65 parts by mass of butadiene (concentration: 20% by mass) was added thereto, followed by polymerization at 70° C. for 45 minutes.

Then, a cyclohexane solution containing 17.5 parts by mass of styrene (concentration: 20% by mass) was charged. Thereafter, methanol was added thereto to stop the polymerization reaction.

A block copolymer obtained as described above had a styrene content of 10% by mass, a weight average molecular weight of $10.5 \times 10^4$, a molecular weight distribution of 1.10, and a vinyl bond content of 24%.

To the thus obtained block copolymer, the hydrogenation catalyst prepared as described above was added in an amount, in terms of Ti, of 100 ppm per 100 parts by mass of the block copolymer, followed by a hydrogenation reaction at a hydrogen pressure of 0.7 MPa at a temperature of 80° C. for about 0.5 hours.

Next, octadecyl-3-(3,5-di-t-butyl-4-hydroxyphenyl)propionate was added as a stabilizer in an amount of 0.3 parts by mass with respect to 100 parts by mass of a copolymer, and thus, a hydrogenated block copolymer (12) was obtained.

The hydrogenated block copolymer (12) thus obtained had a hydrogenation rate of 32%, and a vinyl hydrogenation rate of 95%.

(Hydrogenated Polymer Block (13))

The polymerization reaction and the hydrogenation reaction were performed through the same procedures as those for the above-described hydrogenated block copolymer (I) except that a hydrogenation reaction time was 1.75 hours.

A hydrogenated block copolymer (13) thus obtained had a styrene content of 15% by mass, a weight average molecular weight of $10.3 \times 10^4$, a molecular weight distribution of 1.10, a vinyl bond content of 26%, a hydrogenation rate of 68%, and a vinyl hydrogenation rate of 99%.

(Hydrogenated Polymer Block (14))

The polymerization reaction and the hydrogenation reaction were performed through the same procedures as those for the above described hydrogenated block copolymer (I) except that TMEDA was added in an amount of 0.25 mol per mole of n-butyllithium, and that the hydrogenation reaction was performed for 2.00 hours at a hydrogenation temperature of 50° C.

A hydrogenated block copolymer (14) thus obtained had a styrene content of 15% by mass, a weight average molecular weight of $10.4 \times 10^4$, a molecular weight distribution of 1.10, a vinyl bond content of 35%, a hydrogenation rate of 57%, and a vinyl hydrogenation rate of 75%.

(Hydrogenated Block Copolymer (15))

The polymerization reaction and the hydrogenation reaction were performed through the same procedures as those for the above-described hydrogenated block copolymer (I) except that TMEDA was added in an amount of 1 mol per mole of n-butyllithium.

A hydrogenated block copolymer (15) thus obtained had a styrene content of 15% by mass, a weight average molecular weight of $10.1\times10^4$, a molecular weight distribution of 1.10, a vinyl bond content of 69%, a hydrogenation rate of 40%, and a vinyl hydrogenation rate of 50%.

(Hydrogenated Block Copolymer (16))

Batch polymerization was performed with a tank reactor (internal capacity: 10 L) equipped with a stirrer and a jacket.

First, a cyclohexane solution containing 5 parts by mass of butadiene (concentration: 20% by mass) was charged.

Next, 0.11 parts by mass of n-butyllithium with respect to 100 parts by mass of all monomers, and 0.2 mol, per mol of n-butyllithium, of tetramethylethylenediamine (TMEDA) were added thereto, followed by polymerization at 70° C. for 3 minutes.

Next, a cyclohexane solution containing 20 parts by mass of styrene (concentration: 20% by mass) was added thereto, followed by polymerization at 70° C. for 20 minutes.

Next, a cyclohexane solution containing 55 parts by mass of butadiene (concentration: 20% by mass) was added thereto, followed by polymerization at 70° C. for 40 minutes.

Then, a cyclohexane solution containing 20 parts by mass of styrene (concentration: 20% by mass) was added thereto, followed by polymerization at 70° C. for 20 minutes. Thereafter, methanol was added thereto to stop the polymerization reaction.

A block copolymer obtained as described above had a styrene content of 40% by mass, a weight average molecular weight of $10.2\times10^4$, a molecular weight distribution of 1.10, and a vinyl bond content of 34%.

To the thus obtained block copolymer, the hydrogenation catalyst prepared as described above was added in an amount, in terms of Ti, of 100 ppm per 100 parts by mass of the block copolymer, followed by a hydrogenation reaction at a hydrogen pressure of 0.7 MPa at a temperature of 70° C. for about 0.5 hours.

Next, octadecyl-3-(3,5-di-t-butyl hydroxyphenyl)propionate was added as a stabilizer in an amount of 0.3 parts by mass with respect to 100 parts by mass of the hydrogenated block copolymer, and thus, a hydrogenated block copolymer (16) was obtained.

The hydrogenated block copolymer (16) thus obtained had a hydrogenation rate of 25%, and a vinyl hydrogenation rate of 58%.

(Hydrogenated Block Copolymer (17))

The polymerization reaction and the hydrogenation reaction were performed through the same procedures as those for the above-described hydrogenated block copolymer (6) except that TMEDA was added in an amount of 0.38 mol per mol of n-butyllithium, that the hydrogenation catalyst was added in an amount, in terms of Ti, of 150 ppm per 100 parts by mass of a block copolymer, and that the hydrogenation reaction time was 0.5 hours.

A hydrogenated block copolymer (17) thus obtained had a styrene content of 25% by mass, a weight average molecular weight of $10.7\times10^4$, a molecular weight distribution of 1.10, a vinyl bond content of 40%, a hydrogenation rate of 44%, and a vinyl hydrogenation rate of 81%.

(Hydrogenated Block Copolymer (18))

The polymerization reaction and the hydrogenation reaction were performed through the same procedures as those for the above-described hydrogenated block copolymer (17) except that the hydrogenation catalyst was added in an amount, in terms of Ti, of 100 ppm per 100 parts by mass of a block copolymer, and that octadecyl (3,5-di-t-butyl-4-hydroxyphenyl)propionate was added as a stabilizer in an amount of 2.5 parts by mass with respect to 100 parts by mass of a hydrogenated block copolymer.

A hydrogenated block copolymer (18) thus obtained had a styrene content of 25% by mass, a weight average molecular weight of $10.6\times10^4$, a molecular weight distribution of 1.10, a vinyl bond content of 39%, a hydrogenation rate of 45%, and a vinyl hydrogenation rate of 82%.

(Hydrogenated Block Copolymer (19))

The polymerization reaction and the hydrogenation reaction were performed through the same procedures as those for the above-described hydrogenated block copolymer (18) except that 4-[[4,6-bis(octylthio)-1,3,5-triazin-2-yl]amino]-2,6-di-tert-butylphenol was added as a stabilizer in an amount of 2.5 parts by mass with respect to 100 parts by mass of a hydrogenated block copolymer.

A hydrogenated block copolymer (19) thus obtained had a styrene content of 25% by mass, a weight average molecular weight of $10.4\times10^4$, a molecular weight distribution of 1.10, a vinyl bond content of 39%, a hydrogenation rate of 44%, and a vinyl hydrogenation rate of 81%.

(Hydrogenated Block Copolymer (20))

A polymerization reaction and a hydrogenation reaction were performed through similar procedures to those performed for the hydrogenated block copolymer (18) except that 1'-hydroxy[2,2'-ethylidenebis[4,6-bis(1,1-dimethylpropyl)benzen]]-1-yl acrylate was added as a stabilizer in an amount of 2.5 parts by mass with respect to 100 parts by mass of the hydrogenated block copolymer.

A hydrogenated block copolymer (20) obtained as described above had a styrene content of 25% by mass, a weight average molecular weight of $10.6\times10^4$, a molecular weight distribution of 1.11, a vinyl bond content of 41%, a hydrogenation rate of 45%, and a vinyl hydrogenation rate of 81%.

(Hydrogenated Block Copolymer (21))

A polymerization reaction and a hydrogenation reaction were performed through similar procedures to those performed for the hydrogenated block copolymer (18) except that 1'-hydroxy[2,2'-ethylidenebis[4,6-bis(1,1-dimethylpropyl)benzen]]-1-yl acrylate was added as a stabilizer in an amount of 2.5 parts by mass with respect to 100 parts by mass of the hydrogenated block copolymer.

A hydrogenated block copolymer (21) obtained as described above had a styrene content of 25% by mass, a weight average molecular weight of $10.6\times10^4$, a molecular weight distribution of 1.11, a vinyl bond content of 40%, a hydrogenation rate of 45%, and a vinyl hydrogenation rate of 83%.

(Hydrogenated Block Copolymer (22))

The polymerization reaction and the hydrogenation reaction were performed through the same procedures as those for the above-described hydrogenated block copolymer (18) except that tris(2,4-di-tert-butylphenyl)phosphite was added as a stabilizer in an amount of 2.5 parts by mass with respect to 100 parts by mass of a hydrogenated block copolymer.

A hydrogenated block copolymer (22) thus obtained had a styrene content of 25% by mass, a weight average molecular weight of $10.5\times10^4$, a molecular weight distribution of 1.10, a vinyl bond content of 40%, a hydrogenation rate of 44%, and a vinyl hydrogenation rate of 82%.

(Hydrogenated Block Copolymer (23))

The polymerization reaction and the hydrogenation reaction were performed through the same procedures as those for the above-described hydrogenated block copolymer (18) except that didodecyl 3,3'-thiodipropionate was added as a stabilizer in an amount of 2.5 parts by mass with respect to 100 parts by mass of a hydrogenated block copolymer.

A hydrogenated block copolymer (23) thus obtained had a styrene content of 25% by mass, a weight average molecular weight of $10.6 \times 10^4$, a molecular weight distribution of 1.11, a vinyl bond content of 40%, a hydrogenation rate of 44%, and a vinyl hydrogenation rate of 81%.

(Hydrogenated Block Copolymer (24))

The polymerization reaction and the hydrogenation reaction were performed through the same procedures as those for the above-described hydrogenated block copolymer (6) except that the amount of TMEDA to be added was changed to 0.38 mol per mol of n-butyllithium, and then, a mixed solution of water and sulfuric acid was added in an amount of 30 parts by mass with respect to 100 parts by mass of a hydrogenated block copolymer. It is noted that the amount of sulfuric acid to be added was adjusted so that water to be removed with a decanter in a subsequent process had a pH of 7.0. From the resultant solution, most of the water was removed with a decanter until the amount of water was reduced to 3 parts by mass, and carbon dioxide gas was added to the resultant in an amount of 0.4 mol per mol of a metal of the initiator. Thereafter, octadecyl-3-(3,5-di-t-butyl-4-hydroxyphenyl)propionate was added as a stabilizer in an amount of 0.3 parts by mass. The resultant solution was subjected to a steam stripping method as described in Japanese Patent Publication No. 05-54845, and then, the resultant was kneaded with a twin screw extruder, and desolvated.

A hydrogenated block copolymer (24) thus obtained had a styrene content of 25% by mass, a weight average molecular weight of $10.7 \times 10^4$, a molecular weight distribution of 1.08, a vinyl bond content of 40%, a hydrogenation rate of 44%, and a vinyl hydrogenation rate of 81%.

(End Amine Modified Hydrogenated Block Copolymer (25))

Batch polymerization was performed with a tank reactor (internal capacity: 10 L) equipped with a stirrer and a jacket.

First, a cyclohexane solution containing 12.5 parts by mass of styrene (concentration: 20% by mass) was charged.

Next, 0.11 parts by mass of n-butyllithium with respect to 100 parts by mass of all monomers, and 0.4 mol, per mol of n-butyllithium, of tetramethylethylenediamine (TMEDA) were added thereto, followed by polymerization at 70° C. for 20 minutes.

Next, a cyclohexane solution containing 75 parts by mass of butadiene (concentration: 20% by mass) was added thereto, followed by polymerization at 70° C. for 45 minutes.

Then, a cyclohexane solution containing 12.5 parts by mass of styrene (concentration: 20% by mass) was charged.

Next, 1,3-dimethyl-2-imidazolidinone (hereinafter sometimes abbreviated as "DMI") was added thereto in an equivalent molar amount per mol of n-butyllithium, followed by a reaction at 70° C. for 10 minutes. After the reaction, methanol was added.

An end amine modified block copolymer obtained as described above had a styrene content of 25% by mass, a weight average molecular weight of $10.4 \times 10^4$, a molecular weight distribution of 1.10, a vinyl bond content of 44%, and a modification ratio of 0.06% by mass.

To the thus obtained block copolymer, the hydrogenation catalyst prepared as described above was added in an amount, in terms of Ti, of 100 ppm per 100 parts by mass of the block copolymer, followed by a hydrogenation reaction at a hydrogen pressure of 0.7 MPa at a temperature of 80° C. for about 1.25 hours.

Next, octadecyl-3-(3,5-di-t-butyl-4-hydroxyphenyl)propionate was added as a stabilizer in an amount of 0.3 parts by mass with respect to 100 parts by mass of a block copolymer, and thus, an end amine modified hydrogenated block copolymer (25) was obtained. The thus obtained end amine hydrogenated block copolymer (25) had a hydrogenation rate of 46%, and a vinyl hydrogenation rate of 81%.

(End Amine Modified Hydrogenated Block Copolymer (26))

The same procedures as those for (Modified Hydrogenated Block Copolymer (25)) described above were performed except that the hydrogenation reaction was performed for 1.75 hours.

An end modified block copolymer (26) thus obtained had a styrene content of 25% by mass, a weight average molecular weight of $10.4 \times 10^4$, a molecular weight distribution of 1.10, a vinyl bond content of 44%, a modification ratio of 0.06% by mass, a hydrogenation rate of 67%, and a vinyl hydrogenation rate of 98%.

(End Modified Hydrogenated Block Copolymer (27))

Batch polymerization was performed with a tank reactor (internal capacity: 10 L) equipped with a stirrer and a jacket.

First, a cyclohexane solution containing 12.5 parts by mass of styrene (concentration: 20% by mass) was charged.

Next, 0.11 parts by mass of n-butyllithium with respect to 100 parts by mass of all monomers, and 0.4 mol, per mol of n-butyllithium, of tetramethylethylenediamine (TMEDA) were added thereto, followed by polymerization at 70° C. for 20 minutes.

Next, a cyclohexane solution containing 75 parts by mass of butadiene (concentration: 20% by mass) was added thereto, followed by polymerization at 70° C. for 45 minutes.

Then, a cyclohexane solution containing 12.5 parts by mass of styrene (concentration: 20% by mass) was charged. Thereafter, ε-caprolactam was added thereto in an equivalent molar amount per mole of n-butyllithium, followed by reaction at 70° C. for 10 minutes.

An end modified block copolymer obtained as described above had a styrene content of 25% by mass, a weight average molecular weight of $10.5 \times 10^4$, a molecular weight distribution of 1.10, a vinyl bond content of 45%, and a modification ratio of 0.05% by mass.

To the thus obtained end modified block copolymer, the hydrogenation catalyst prepared as described above was added in an amount, in terms of Ti, of 100 ppm per 100 parts by mass of the end modified block copolymer, followed by a hydrogenation reaction at a hydrogen pressure of 0.7 MPa at a temperature of 80° C. for about 1.25 hours.

Next, octadecyl-3-(3,5-di-t-butyl-4-hydroxyphenyl)propionate was added as a stabilizer in an amount of 0.3 parts by mass with respect to 100 parts by mass of an end modified hydrogenated block copolymer, and thus, an end modified hydrogenated block copolymer (27) was obtained.

The thus obtained end modified hydrogenated block copolymer (27) had a hydrogenation rate of 45%, and a vinyl hydrogenation rate of 80%.

(End Hydroxyl Group Modified Hydrogenated Block Copolymer (28))

The same procedures as those for (End Modified Hydrogenated Block Copolymer (27)) described above were performed except that the hydrogenation reaction was performed for 1.75 hours.

An end modified hydrogenated block copolymer (28) thus obtained had a styrene content of 25% by mass, a weight average molecular weight of $10.4 \times 10^4$, a molecular weight distribution of 1.09, a vinyl bond content of 44%, a modification ratio of 0.05% by mass, a hydrogenation rate of 66%, and a vinyl hydrogenation rate of 98%.

[Modified Block Copolymer]

A modified block copolymer constituting each of resin compositions described below was prepared as follows.

Compounding was performed with a twin screw extruder with a temperature in an entire lengthwise region of the extruder set to 150° C. to 220° C.

A screw speed was set to 270 rpm, and an extrusion amount was set to 5 kg/h.

Each of the hydrogenated block copolymers (1) to (24) was mixed with maleic anhydride, and the resultant was supplied to a vent extruder.

TABLE 1

|  |  | (1) | (2) | (3) | (4) | (5) | (6) | (7) | (8) | (9) | (10) | (11) |
|---|---|---|---|---|---|---|---|---|---|---|---|---|
| Structure |  | — | A-B-A | A-B-A | A-B-A | A-B-A | A-B-A | A-B-A | A-B-A | B-A-B-A | A-B, A-B-B-A | A-B-A | A-B-A |
| Vinyl Aromatic Compound Unit Content | mass % | 15 | 15 | 15 | 15 | 15 | 25 | 10 | 25 | 20 | 15 | 15 |
| Vinyl Bond Content | % | 22 | 45 | 19 | 12 | 24 | 23 | 24 | 30 | 18 | 24 | 19 |
| Hydrogenation Rate | % | 32 | 40 | 45 | 34 | 26 | 30 | 36 | 40 | 25 | 33 | 30 |
| Vinyl Hydrogenation Rate | % | 95 | 83 | 99 | 99 | 86 | 89 | 95 | 96 | 95 | 97 | 98 |
| Metal Amount | ppm | 103 | 101 | 101 | 103 | 102 | 103 | 104 | 105 | 103 | 104 | 103 |
| tan δ Peak Temperature | ° C. | −77 | −56 | −61 | −73 | −74 | −74 | −73 | −68 | −76 | −75 | −77 |

TABLE 2

|  |  | (12) | (13) | (14) | (15) | (16) | (17) | (18) | (19) |
|---|---|---|---|---|---|---|---|---|---|
| Structure |  | — | A-B-A | A-B-A | A-B-A | A-B-A | B-A-B-A | A-B-A | A-B-A | A-B-A |
| Vinyl Aromatic Compound Unit Content | mass % | 35 | 15 | 15 | 15 | 40 | 25 | 25 | 25 |
| Vinyl Bond Content | % | 24 | 26 | 35 | 69 | 34 | 40 | 39 | 39 |
| Hydrogenation Rate | % | 32 | 68 | 57 | 40 | 25 | 44 | 45 | 44 |
| Vinyl Hydrogenation Rate | % | 95 | 99 | 75 | 50 | 58 | 81 | 82 | 81 |
| Metal Amount | ppm | 101 | 105 | 104 | 104 | 103 | 159 | 102 | 101 |
| tan δ Peak Temperature | ° C. | −68 | −48 | −54 | −41 | −72 | −64 | −64 | −65 |

TABLE 3

|  |  | (20) | (21) | (22) | (23) | (24) | (25) | (26) | (27) | (28) |
|---|---|---|---|---|---|---|---|---|---|---|
| Structure |  | — | A-B-A | A-B-A | A-B-A | A-B-A | A-B-A | A-B-A | A-B-A | A-B-A | A-B-A |
| Vinyl Aromatic Compound Unit Content | mass % | 25 | 25 | 25 | 25 | 25 | 25 | 25 | 25 | 25 |
| Vinyl Bond Content | % | 41 | 40 | 40 | 40 | 40 | 44 | 45 | 45 | 44 |
| Hydrogenation Rate | % | 45 | 45 | 44 | 44 | 44 | 46 | 67 | 45 | 66 |
| Vinyl Hydrogenation Rate | % | 81 | 83 | 82 | 81 | 81 | 81 | 98 | 80 | 98 |
| Metal Amount | ppm | 103 | 102 | 101 | 102 | 52 | 104 | 103 | 103 | 103 |
| tan δ Peak Temperature | ° C. | −64 | −63 | −64 | −64 | −64 | −63 | −49 | −63 | −49 |

In Table 4 below, in a modified block copolymer (1)-6, a mesh was inserted in an extruder die portion to reduce a cross-linked component.

A strand discharged from the extruder was formed into a pellet, which was dried at about 60° C. for 3 hours.

An amount of maleic anhydride added (assuming that the amount of the block copolymer was 100 parts), a modification ratio, and a tan δ peak temperature obtained based on a viscoelastic spectrum after the modification are shown in Table 4 to Table 7.

In each of Table 4 to Table 7, with the numbers of the used hydrogenated block copolymers shown, the amount of maleic anhydride mixed, and the like are shown distinctively with respect to modification conditions.

Besides, productivity was evaluated as follows based on exchange frequency of the mesh per hour at the time of the extrusion:

○: 3 times/hour Δ: 10 times/hour x: 15 times/hour

In these tables, (a) indicates the amount (in parts by mass) added per 100 parts by mass of the hydrogenated block copolymer. (b) indicates that gelation occurred.

(c) indicates that analysis could not be performed.

TABLE 4

|  |  | (1)-1 | (1)-2 | (1)-3 | (1)-4 | (1)-5 | (1)-6 | (2)-1 | (3)-1 |
|---|---|---|---|---|---|---|---|---|---|
| Maleic anhydride | parts(a) | 0.5 | 1.0 | 2.5 | 4.0 | 7.5 | 4.0 | 1.0 | 1.0 |
| Resin Temperature | ° C. | 223 | 225 | 226 | 259 | 266 | 258 | 222 | 222 |
| Added Amount | wt % | 0.070 | 0.2 | 0.8 | 1.0 | 5.6 | 1.1 | 0.30 | 0.11 |
| Productivity | — | ○ | ○ | Δ | X | X | X | ○ | ○ |
| tan δ Peak Temperature | ° C. | −77 | −77 | −76 | −65 | −61 | −64 | −56 | −61 |
| b Value | — | 5 | 8 | 15 | 35 | 39 | 35 | 7 | 7 |
| Amount of Cross-linked Component | g | 0.011 | 0.084 | 0.150 | 0.42 | 0.51 | 0.29 | 0.023 | 0.021 |

TABLE 5

|  |  | (4)-1 | (5)-1 | (6)-1 | (7)-1 | (8)-1 | (9)-1 | (10)-1 | (11)-1 |
|---|---|---|---|---|---|---|---|---|---|
| Maleic anhydride | parts(a) | 1.0 | 1.0 | 1.0 | 1.0 | 1.0 | 1.0 | 1.0 | 1.0 |
| Resin Temperature | ° C. | 224 | 226 | 225 | 224 | 226 | 225 | 224 | 223 |
| Added Amount | wt % | 0.3 | 0.33 | 0.090 | 0.24 | 0.22 | 0.15 | 0.14 | 0.15 |
| Productivity | — | ○ | ○ | ○ | ○ | ○ | ○ | ○ | ○ |
| tan δ Peak Temperature | ° C. | −73 | −74 | −74 | −73 | −68 | −76 | −75 | −77 |
| b Value | — | 8 | 9 | 9 | 8 | 7 | 7 | 7 | 9 |
| Amount of Cross-linked Component | g | 0.02 | 0.023 | 0.022 | 0.02 | 0.021 | 0.022 | 0.024 | 0.024 |

TABLE 6

|  |  | (12)-1 | (13)-1 | (13)-2 | (14)-1 | (15)-1 | (16)-1 | (17)-1 | (18)-1 |
|---|---|---|---|---|---|---|---|---|---|
| Maleic anhydride | parts(a) | 1.0 | 1.0 | 2.5 | 0.5 | 0.5 | 2.5 | 1.0 | 1.0 |
| Resin Temperature | ° C. | 223 | 222 | 222 | 223 | 250 | 253 | 229 | 224 |
| Added Amount | wt % | 0.090 | 0.060 | 0.14 | 0.094 | —(b) | 0.9 | 0.092 | 0.088 |
| Productivity | — | ○ | ○ | ○ | ○ | ○ | ○ | Δ | ○ |
| tan δ Peak Temperature | ° C. | −68 | −48 | −48 | −48 | —(c) | −63 | −62 | −62 |
| b Value | — | 5 | 8 | 15 | 33 | 7 | 7 | 31 | 33 |
| Amount of Cross-linked Component | g | 0.081 | 0.083 | 0.14 | 0.050 | 0.058 | 0.13 | 0.15 | 0.078 |

TABLE 7

|  |  | (19)-1 | (20)-1 | (21)-1 | (22)-1 | (23)-1 | (24)-1 | (24)-2 |
|---|---|---|---|---|---|---|---|---|
| Maleic anhydride | parts(a) | 1.0 | 1.0 | 1.0 | 1.0 | 1.0 | 1.0 | 4.0 |
| Resin Temperature | °C. | 221 | 222 | 225 | 224 | 224 | 223 | 258 |
| Added Amount | wt % | 0.095 | 0.094 | 0.094 | 0.094 | 0.095 | 0.1 | 1.2 |
| Productivity | — | ○ | ○ | ○ | ○ | ○ | ○ | X |
| tan δ Peak Temperature | °C. | −62 | −62 | −62 | −62 | −62 | −62 | −61 |
| b Value | — | 35 | 33 | 36 | 35 | 35 | 4 | 26 |
| Amount of Cross-linked Component | g | 0.072 | 0.075 | 0.073 | 0.072 | 0.072 | 0.080 | 0.41 |

As shown in Table 1 to Table 7, in a modified block copolymer (1)-4, the amount of maleic anhydride was over the amount most preferable from the viewpoint of productivity described above, and hence, the productivity was largely lowered due to control of the resin temperature to fall in the above-described preferable temperature range. Besides, from the viewpoint of a b value, the amount of maleic anhydride exceeded the preferable amount, and hence the b value was out of the range of the condition (v).

On the other hand, in a hydrogenated block copolymer (24)-2, the amount of maleic anhydride added was the same as that in the hydrogenated block copolymer (1)-4, but the amount of metals was small, and hence the b value was out of the range of the condition (v).

In the hydrogenated block copolymer (15), the vinyl hydrogenation rate was out of the range of the condition (iv), and hence the thermal stability was poor, and the copolymer was gelled with heat applied in modification.

Also in the hydrogenated block copolymer (14), the vinyl hydrogenation rate was out of the range of the condition (iv), but the hydrogenation rate was higher than that of the hydrogenated block copolymer (15), and hence the copolymer could be modified without gelation. A given side reaction was, however, caused, and the tan δ peak temperature was increased.

Also in the hydrogenated block copolymer (16), the vinyl hydrogenation rate was out of the range of the condition (iv), but the amount of the conjugated diene compound, which causes a side reaction, was smaller than in the hydrogenated block copolymer (15), and hence the copolymer could be modified without gelation. A given side reaction was, however, caused, and the tan δ peak temperature was increased.

In the hydrogenated block copolymer (17), the amount of metals was out of the preferable range, and hence the b value was out of the range of the condition (v).

In each of the hydrogenated block copolymers (18) to (23), the amount of the stabilizer was out of the most preferable range, and hence the b value was out of the range of the condition (v).

[Component (II): Resin Having Polar Group (Excluding Component (I))]

The following commercially available products were used.

Polyamide resin: Leona 1300S (manufactured by Asahi Kasei Corporation)

End amine concentration/carboxylic acid concentration=22/78

UBE nylon 1013B (manufactured by Ube Industries, Ltd.)

End amine concentration/carboxylic acid concentration=42/58

GF reinforced polyamide resin: 1300G

Ethylene-vinyl alcohol (EVOH) resin: Soarnol E/ET

[Examples 1 to 37] and [Comparative Examples 1 to 18]

Resin compositions were prepared using the above-described components in accordance with the following preparation method.

Component ratios and physical properties are shown in tables below.

<Preparation Method for Resin Composition>

The component (I) and the component (II) were compounded with a twin screw extruder with a temperature in an entire lengthwise region of the extruder set to 180 to 280° C.

A screw speed was set to about 270 rpm, and an extrusion amount was set to 5 kg/h.

The component (I) and the component (II) were supplied through a throat of the extruder in general.

A strand discharged from the extruder was formed into a pellet, which was dried at about 100° C. for 3 hours. The dried pellet was injection molded into a dumbbell specimen A for physical property measurement described below.

<Method for Measuring Physical Properties of Resin Composition>

((1) Toughness)

Elongation at break was measured by a tensile test according to ISO 527 to be evaluated. A tensile speed was set to 5 mm/min, and a measurement temperature was set to −50° C. and −70° C.

((2) Shock Resistance)

Notched Charpy impact strength was measured in accordance with JIS K 7111-1 to be evaluated.

As a specimen, the both ends of the above-described ISO dumbbell were cut, the resultant parallel portion was used to produce a strip specimen having a length of about 80 mm, a width of about 10 mm, and a thickness of about 4 mm, and an A shape was employed as the notch shape, and an edgewise impact direction was employed.

A measurement temperature was set to −50° C. and −70° C. A unit of $kJ/m^2$ was used.

TABLE 8

| | | | Example 1 | Example 2 | Example 3 | Example 4 | Example 5 | Example 6 | Example 7 | Example 8 | Example 9 |
|---|---|---|---|---|---|---|---|---|---|---|---|
| Component (I) | (1)-1 | % | 10 | 20 | 30 | 20 | 20 | — | — | — | — |
| | (1)-2 | % | — | — | — | — | — | 20 | — | — | — |
| | (1)-3 | % | — | — | — | — | — | — | 20 | — | — |
| | (2)-1 | % | — | — | — | — | — | — | — | 20 | — |
| | (3)-1 | % | — | — | — | — | — | — | — | — | 20 |
| | (4)-1 | % | — | — | — | — | — | — | — | — | — |
| | (5)-1 | % | — | — | — | — | — | — | — | — | — |
| | (6)-1 | % | — | — | — | — | — | — | — | — | — |
| | (7)-1 | % | — | — | — | — | — | — | — | — | — |
| | (8)-1 | % | — | — | — | — | — | — | — | — | — |
| | (9)-1 | % | — | — | — | — | — | — | — | — | — |
| | (10)-1 | % | — | — | — | — | — | — | — | — | — |
| | (11)-1 | % | — | — | — | — | — | — | — | — | — |
| Component (II) | 1300S | % | 90 | 80 | 70 | — | — | 80 | 80 | 80 | 80 |
| | 1300G | % | — | — | — | 80 | — | — | — | — | — |
| | 1013B | % | — | — | — | — | 80 | — | — | — | — |
| Shock Resistance | −50° C. | KJ/m² | 14.3 | 22.7 | 28.3 | 17.1 | 23.0 | 21.6 | 20.7 | 18.7 | 19.3 |
| | −70° C. | KJ/m² | 11.9 | 19.7 | 26.7 | 13.5 | 20.1 | 19.2 | 18.0 | 16.6 | 18.0 |
| Toughness | −50° C. | % | 18.2 | 37.4 | 43.6 | 22.8 | 44.0 | 35.4 | 34.2 | 29.8 | 31.5 |
| | −70° C. | % | 13.3 | 27.5 | 34.8 | 19.3 | 28.8 | 24.7 | 23.8 | 19.6 | 22.0 |

TABLE 9

| | | | Example 10 | Example 11 | Example 12 | Example 13 | Example 14 | Example 15 | Example 16 |
|---|---|---|---|---|---|---|---|---|---|
| Component (I) | (1)-1 | % | — | — | — | — | — | — | — |
| | (1)-2 | % | — | — | — | — | — | — | — |
| | (1)-3 | % | — | — | — | — | — | — | — |
| | (1)-4 | % | — | — | — | — | — | — | — |
| | (1)-5 | % | — | — | — | — | — | — | — |
| | (1)-6 | % | — | — | — | — | — | — | — |
| | (2)-1 | % | — | — | — | — | — | — | — |
| | (3)-1 | % | — | — | — | — | — | — | — |
| | (4)-1 | % | 20 | — | — | — | — | — | — |
| | (5)-1 | % | — | 20 | — | — | — | — | — |
| | (6)-1 | % | — | — | 20 | — | — | — | — |
| | (7)-1 | % | — | — | — | 20 | — | — | — |
| | (8)-1 | % | — | — | — | — | 20 | — | — |
| | (9)-1 | % | — | — | — | — | — | 20 | — |
| | (10)-1 | % | — | — | — | — | — | — | 20 |
| | (11)-1 | % | — | — | — | — | — | — | — |
| | (17)-1 | % | — | — | — | — | — | — | — |
| | (18)-1 | % | — | — | — | — | — | — | — |
| | (19)-1 | % | — | — | — | — | — | — | — |
| | (20)-1 | % | — | — | — | — | — | — | — |
| | (21)-1 | % | — | — | — | — | — | — | — |
| | (22)-1 | % | — | — | — | — | — | — | — |
| | (23)-1 | % | — | — | — | — | — | — | — |
| | (24)-1 | % | — | — | — | — | — | — | — |
| | (24)-2 | % | — | — | — | — | — | — | — |
| | (25) | % | — | — | — | — | — | — | — |
| | (27) | % | — | — | — | — | — | — | — |
| Component (II) | 1300S | % | 80 | 80 | 80 | 80 | 80 | 80 | 80 |
| | 1300G | % | — | — | — | — | — | — | — |
| | 1013B | % | — | — | — | — | — | — | — |
| Shock Resistance | −50° C. | KJ/m² | 22.8 | 22.6 | 18.8 | 22.5 | 22.3 | 21.0 | 22.8 |
| | −70° C. | KJ/m² | 20.2 | 19.9 | 17.6 | 20.3 | 20.1 | 18.9 | 20.7 |
| Toughness | −50° C. | % | 37.0 | 36.4 | 30.3 | 36.9 | 37.2 | 38.0 | 27.7 |
| | −70° C. | % | 27.2 | 26.8 | 20.4 | 27.3 | 27.2 | 27.8 | 28.0 |

TABLE 10

|  |  |  | Example 17 | Example 18 | Example 19 | Example 20 | Example 21 | Example 22 | Example 23 |
|---|---|---|---|---|---|---|---|---|---|
| Component (I) | (1)-1 | % | — | — | — | — | — | — | — |
|  | (1)-2 | % | — | — | — | — | — | — | — |
|  | (1)-3 | % | — | — | — | — | — | — | — |
|  | (1)-4 | % | — | 20 | — | — | — | — | — |
|  | (1)-5 | % | — | — | 20 | — | — | — | — |
|  | (1)-6 | % | — | — | — | 20 | — | — | — |
|  | (2)-1 | % | — | — | — | — | — | — | — |
|  | (3)-1 | % | — | — | — | — | — | — | — |
|  | (4)-1 | % | — | — | — | — | — | — | — |
|  | (5)-1 | % | — | — | — | — | — | — | — |
|  | (6)-1 | % | — | — | — | — | — | — | — |
|  | (7)-1 | % | — | — | — | — | — | — | — |
|  | (8)-1 | % | — | — | — | — | — | — | — |
|  | (9)-1 | % | — | — | — | — | — | — | — |
|  | (10)-1 | % | — | — | — | — | — | — | — |
|  | (11)-1 | % | 20 | — | — | — | — | — | — |
|  | (17)-1 | % | — | — | — | — | 20 | — | — |
|  | (18)-1 | % | — | — | — | — | — | 20 | — |
|  | (19)-1 | % | — | — | — | — | — | — | 20 |
|  | (20)-1 | % | — | — | — | — | — | — | — |
|  | (21)-1 | % | — | — | — | — | — | — | — |
|  | (22)-1 | % | — | — | — | — | — | — | — |
|  | (23)-1 | % | — | — | — | — | — | — | — |
|  | (24)-1 | % | — | — | — | — | — | — | — |
|  | (24)-2 | % | — | — | — | — | — | — | — |
|  | (25) | % | — | — | — | — | — | — | — |
|  | (27) | % | — | — | — | — | — | — | — |
| Component (II) | 1300S | % | 80 | 80 | 80 | 80 | 80 | 80 | 80 |
|  | 1300G | % | — | — | — | — | — | — | — |
|  | 1013B | % | — | — | — | — | — | — | — |
| Shock Resistance | −50° C. | KJ/m² | 20.9 | 14.8 | 14.2 | 14.9 | 14.2 | 14.5 | 14.4 |
|  | −70° C. | KJ/m² | 19.7 | 12.3 | 11.6 | 12.3 | 11.3 | 11.2 | 11.0 |
| Toughness | −50° C. | % | 36.3 | 21.3 | 20.8 | 21.4 | 22.1 | 22.3 | 22.4 |
|  | −70° C. | % | 26.8 | 17.6 | 16.7 | 17.7 | 17.0 | 17.1 | 17.4 |

TABLE 11

|  |  |  | Example 24 | Example 25 | Example 26 | Example 27 | Example 28 | Example 29 | Example 30 | Example 31 | Example 32 | Example 33 |
|---|---|---|---|---|---|---|---|---|---|---|---|---|
| Component (I) | (1) | % | — | — | — | — | — | — | — | — | 10 | 5 |
|  | (1)-1 | % | — | — | — | — | — | — | — | — | 10 | 10 |
|  | (1)-2 | % | — | — | — | — | — | — | — | — | — | — |
|  | (1)-3 | % | — | — | — | — | — | — | — | — | — | — |
|  | (1)-4 | % | — | — | — | — | — | — | — | — | — | — |
|  | (1)-5 | % | — | — | — | — | — | — | — | — | — | — |
|  | (1)-6 | % | — | — | — | — | — | — | — | — | — | — |
|  | (2)-1 | % | — | — | — | — | — | — | — | — | — | — |
|  | (3)-1 | % | — | — | — | — | — | — | — | — | — | — |
|  | (4)-1 | % | — | — | — | — | — | — | — | — | — | — |
|  | (5)-1 | % | — | — | — | — | — | — | — | — | — | — |
|  | (6)-1 | % | — | — | — | — | — | — | — | — | — | — |
|  | (7)-1 | % | — | — | — | — | — | — | — | — | — | — |
|  | (8)-1 | % | — | — | — | — | — | — | — | — | — | — |
|  | (9)-1 | % | — | — | — | — | — | — | — | — | — | — |
|  | (10)-1 | % | — | — | — | — | — | — | — | — | — | — |
|  | (11)-1 | % | — | — | — | — | — | — | — | — | — | — |
|  | (17)-1 | % | — | — | — | — | — | — | — | — | — | — |
|  | (18)-1 | % | — | — | — | — | — | — | — | — | — | — |
|  | (19)-1 | % | — | — | — | — | — | — | — | — | — | — |
|  | (20)-1 | % | 20 | — | — | — | — | — | — | — | — | — |
|  | (21)-1 | % | — | 20 | — | — | — | — | — | — | — | — |
|  | (22)-1 | % | — | — | 20 | — | — | — | — | — | — | — |
|  | (23)-1 | % | — | — | — | 20 | — | — | — | — | — | — |
|  | (24)-1 | % | — | — | — | — | 20 | — | — | — | — | — |
|  | (24)-2 | % | — | — | — | — | — | 20 | — | — | — | — |
|  | (25) | % | — | — | — | — | — | — | 20 | — | — | — |
|  | (27) | % | — | — | — | — | — | — | — | 20 | — | — |

TABLE 11-continued

| | | | Example 24 | Example 25 | Example 26 | Example 27 | Example 28 | Example 29 | Example 30 | Example 31 | Example 32 | Example 33 |
|---|---|---|---|---|---|---|---|---|---|---|---|---|
| Component (II) | 1300S | % | 80 | 80 | 80 | 80 | 80 | 80 | 80 | 80 | 80 | 80 |
| | 1300G | % | — | — | — | — | — | — | — | — | — | — |
| | 1013B | % | — | — | — | — | — | — | — | — | — | — |
| Shock | −50° C. | KJ/m$^2$ | 14.2 | 14.1 | 14.3 | 14.2 | 18.4 | 14.9 | 12.2 | 11.8 | 12.1 | 13.5 |
| Resistance | −70° C. | KJ/m$^2$ | 11.4 | 11.1 | 11.3 | 11.2 | 15.3 | 12.3 | 11.3 | 11.0 | 11.5 | 12.2 |
| Toughness | −50° C. | % | 22.2 | 22.2 | 22.4 | 22.2 | 27.5 | 21.9 | 20.3 | 20.0 | 21.7 | 22.5 |
| | −70° C. | % | 17.2 | 17.2 | 17.2 | 17.1 | 21.1 | 17.2 | 15.1 | 14.9 | 16.9 | 17.1 |

TABLE 12

| | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Component (I) | (12)-1 | % | — | — | — | 10 | 20 | 30 | 20 |
| | (13)-1 | % | — | — | — | — | — | — | — |
| | (13)-2 | % | — | — | — | — | — | — | — |
| | (14)-1 | % | — | — | — | — | — | — | — |
| | (16)-1 | % | — | — | — | — | — | — | — |
| | (26) | % | — | — | — | — | — | — | — |
| | (28) | % | — | — | — | — | — | — | — |
| Component (II) | 1300S | % | 100 | — | — | 90 | 80 | 70 | — |
| | 1300G | % | — | 100 | — | — | — | — | 80 |
| | 1013B | % | — | — | 100 | — | — | — | — |
| Shock | −50° C. | KJ/m$^2$ | 5.2 | 4.3 | 6.0 | 7.3 | 10.7 | 16.3 | 7.5 |
| Resistance | −70° C. | KJ/m$^2$ | 3.4 | 2.8 | 4.1 | 6.6 | 9.6 | 14.3 | 7.3 |
| Toughness | −50° C. | % | 6.1 | 4.5 | 8.2 | 8.4 | 19.7 | 24.1 | 9.9 |
| | −70° C. | % | 4.3 | 3.3 | 5.1 | 5.9 | 13.3 | 16.9 | 7.5 |

| | | | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|---|
| Component (I) | (12)-1 | % | 20 | — | — | — | — | — | — |
| | (13)-1 | % | — | 20 | — | — | — | — | — |
| | (13)-2 | % | — | — | 20 | — | — | — | — |
| | (14)-1 | % | — | — | — | 20 | — | — | — |
| | (16)-1 | % | — | — | — | — | 20 | — | — |
| | (26) | % | — | — | — | — | — | 20 | — |
| | (28) | % | — | — | — | — | — | — | 20 |
| Component (II) | 1300S | % | — | 80 | 80 | 80 | 80 | 80 | 80 |
| | 1300G | % | — | — | — | — | — | — | — |
| | 1013B | % | 80 | — | — | — | — | — | — |
| Shock | −50° C. | KJ/m$^2$ | 11.6 | 9.2 | 8.5 | 10.4 | 9.4 | 6.6 | 6.5 |
| Resistance | −70° C. | KJ/m$^2$ | 10.2 | 8.3 | 7.9 | 9.3 | 6.8 | 4.1 | 4.3 |
| Toughness | −50° C. | % | 18.7 | 13.9 | 14.0 | 18.5 | 14.2 | 7.1 | 7.0 |
| | −70° C. | % | 14.4 | 8.7 | 9.1 | 13.1 | 11.0 | 5.0 | 5.1 |

TABLE 13

| | | | Example 34 | Example 35 | Example 36 | Example 37 | Comparative Example 15 | Comparative Example 16 | Comparative Example 17 | Comparative Example 18 |
|---|---|---|---|---|---|---|---|---|---|---|
| Component (I) | (1)-3 | % | 20 | 30 | — | — | — | — | — | — |
| | (3)-1 | % | — | — | 20 | — | — | — | — | — |
| | (7)-1 | % | — | — | — | 20 | — | — | — | — |
| | (12)-1 | % | — | — | — | — | — | 20 | 30 | — |
| | (13)-1 | % | — | — | — | — | — | — | — | 20 |
| Component (II) | EVOH | % | 80 | 70 | 80 | 80 | 100 | 80 | 70 | 80 |

TABLE 13-continued

| | | Exam-ple 34 | Exam-ple 35 | Exam-ple 36 | Exam-ple 37 | Compar-ative Exam-ple 15 | Compar-ative Exam-ple 16 | Compar-ative Exam-ple 17 | Compar-ative Exam-ple 18 |
|---|---|---|---|---|---|---|---|---|---|
| Shock | −50° C. KJ/m² | 17.3 | 21.3 | 15.6 | 18.2 | 5.3 | 9.6 | 11.3 | 8.3 |
| Resistance | −70° C. KJ/m² | 14.7 | 17.6 | 13.3 | 15.4 | 3.7 | 7.3 | 9.4 | 5.2 |
| Toughness | −50° C. % | 22.3 | 24.4 | 21.0 | 24.2 | 5.7 | 13.2 | 15.4 | 8.2 |
| | −70° C. % | 18.9 | 20.1 | 17.5 | 19.5 | 3.7 | 9.9 | 11.4 | 6.8 |

Examples 1 to 37 exhibited excellent shock resistance and toughness even under ultralow temperature conditions as compared with Comparative Examples 1 to 18.

In Comparative Examples 4 to 8, 12, 16, and 17, the hydrogenated block copolymers (12) and (16) containing the vinyl aromatic compound in the amounts out of the range of the present invention were used, and hence, these compositions were in a rubber state at an ultralow temperature, but were poor in shock resistance and toughness because of high rigidity.

Besides, although the modified block copolymers (17) to (23) were obtained through the polymerization reaction and the hydrogenation reaction performed under the same conditions as those for the modified block copolymer (12), the amount of the stabilizer and the amount of metals were out of the most preferable ranges, and hence, the b value, and shock resistance and toughness under ultralow temperature conditions were deteriorated.

Since Comparative Examples 9 to 11, 13, 14, and 18 used the hydrogenated block copolymers (13) and (14) having the hydrogenation rates out of the range of the present invention, the tan δ peak temperature was present on a higher temperature side than the measurement temperature, and hence the compositions were in a glass state under ultralow temperature conditions, and were poor in shock resistance and toughness.

This application is based upon a Japanese patent application filed in the JPO on May 27, 2020 (Japanese Patent Application No. 2020-091932), the entire contents of which are incorporated herein by reference.

INDUSTRIAL APPLICABILITY

The resin composition of the present invention is industrially applicable as a material of a molded article, a container, and a housing that are used under ultralow temperature conditions, or may be exposed to an ultralow temperature in use.

The invention claimed is:

1. A resin composition, comprising:
a component (I) of a modified block copolymer (I) that has a polymer block (A) mainly comprising a vinyl aromatic compound unit, and a polymer block (B) mainly comprising a conjugated diene compound unit, and has 0.01% by mass or more of a polar group; and
a component (II) of a resin (II) having a polar group (excluding the component (I)),
wherein a mass ratio between the component (I) and the component (II), (I)/(II), is 1/99 to 70/30, and
the component (I) satisfies the following conditions (i) to (iii):
<Condition (i)>
a content of the vinyl aromatic compound unit in the modified block copolymer (I) is 1 to 30% by mass;

<Condition (ii)>
the polymer block (B) comprises a 1,2-bond and/or 3,4-bond derived unit (a), and a 1,4-bond derived unit (b), and a content of the 1,2-bond and/or 3,4-bond derived unit (a) is 1 to 55% assuming that a total content of the polymer block (B) is 100%; and
<Condition (iii)>
the polymer block (B) comprises an alkenyl monomer unit (a1) resulting from hydrogenation of the 1,2-bond and/or 3,4-bond derived unit (a), and an alkenyl monomer unit (b1) resulting from hydrogenation of the 1,4-bond derived unit (b), and a total content of the alkenyl monomer unit (a1) and the alkenyl monomer unit (b1) is 5 to 55% assuming that the total content of the polymer block (B) is 100%.

2. The resin composition according to claim 1, wherein the component (I) further satisfies the following condition (iv):
<Condition (iv)>
an amount of the alkenyl monomer unit (a1) resulting from hydrogenation of the unit (a) is 80% or more assuming that an amount of the 1,2-bond and/or 3,4-bond derived unit (a) in the polymer block (B) is 100%.

3. The resin composition according to claim 1,
wherein the component (I) is a modified block copolymer having 0.01 to 5% by mass of the polar group.

4. The resin composition according to claim 1,
wherein the component (II) is at least one selected from the group consisting of a polyamide-based resin, an acrylic-based resin, a polyacetal resin, a polycarbonate resin, a polyethylene terephthalate resin, a polybutylene terephthalate resin, a polyphenylene sulfide resin, a polysulfone resin, an epoxy resin, and a phenol resin.

5. The resin composition according to claim 1, comprising at least one stabilizer as a component (III).

6. The resin composition according to claim 1, wherein the component (I) further satisfies the following condition (v):
<Condition (v)>
a b value obtained by measuring, with a color-difference meter, a sheet with a thickness of 2 mm obtained by compression molding the component (I) is 30 or less.

7. The resin composition according to claim 1, wherein the polar group of the component (I) is comprised in the polymer block (B).

8. The resin composition according to claim 1, wherein the polar group of the component (I) is at least one selected from the group consisting of an acid anhydride group, a carboxylic acid group, and a hydroxyl group.

9. The resin composition according to claim 1, wherein the component (I) further satisfies the following condition (vi):
<Condition (vi)>
when 5 g of the component (I) is dissolved in 200 ml of toluene to be suction filtered through filter paper (thickness: 0.2 mm, maximum diameter: 6 um, filtering efficiency: 65%), a component remaining on the filter paper calculated based on a mass difference between the filter paper after sufficiently drying and the filter paper before filtration is 0.3 g or less.

10. The resin composition according to claim 1, comprising, as a component (V) and in an amount of 100 parts by mass or less with respect to 100 parts by mass of the component (I) in the resin composition, a block copolymer (V) that has a polymer block (A') mainly comprising a vinyl aromatic compound unit and a polymer block (B') mainly comprising a conjugated diene compound unit, has no polar group bonded thereto, and satisfies the following conditions (vii) to (ix):

<Condition (vii)>
a content of the vinyl aromatic compound unit in the block copolymer (V) is 1 to 30% by mass;

<Condition (viii)>
the polymer block (B') of the block copolymer (V) comprises a 1,2-bond and/or 3,4-bond derived unit (a'), and a 1,4-bond derived unit (b'), and a content of the 1,2-bond and/or 3,4-bond derived unit (a') is 1 to 55% assuming that a total content of the polymer block (B') is 100%; and <Condition (ix)>
the polymer block (B') comprises an alkenyl monomer unit (a'1) resulting from hydrogenation of the 1,2-bond and/or 3,4-bond derived unit (a'), and an alkenyl monomer unit (b'1) resulting from hydrogenation of the 1,4-bond derived unit (b'), and a total content of the alkenyl monomer unit (a'1) and the alkenyl monomer unit (b'1) is 5 to 55% assuming that the total content of the polymer block (B') is 100%.

11. A molded article of the resin composition according to claim 1.

12. The molded article according to claim 11, being a container.

13. The molded article according to claim 11, being a cylindrical container.

14. The molded article according to claim 11, being a housing.

15. The molded article according to claim 11, being a sheet.

16. The molded article according to claim 11, being a pipe.

* * * * *